(12) United States Patent
Muruganathan et al.

(10) Patent No.: US 11,349,537 B2
(45) Date of Patent: *May 31, 2022

(54) CODEBOOK SUBSET RESTRICTION FOR FULL-DIMENSION MIMO

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,805

(22) Filed: Mar. 16, 2020

(65) Prior Publication Data
US 2020/0220594 A1 Jul. 9, 2020

Related U.S. Application Data

(63) Continuation of application No. 15/773,796, filed as application No. PCT/SE2016/051096 on Nov. 7, 2016, now Pat. No. 10,594,373.

(Continued)

(51) Int. Cl.
*H04B 7/0456* (2017.01)
*H04B 7/06* (2006.01)

(52) U.S. Cl.
CPC ........ *H04B 7/0478* (2013.01); *H04B 7/0626* (2013.01); *H04B 7/0639* (2013.01); *H04B 7/063* (2013.01)

(58) Field of Classification Search
CPC .................................................. H04B 7/0478
(Continued)

(56) References Cited

U.S. PATENT DOCUMENTS 7,817,739 B2  10/2010  Wennstroem et al.
10,594,373 B2 *  3/2020  Muruganathan ..... H04B 7/0639
(Continued)

OTHER PUBLICATIONS

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 1-212.
(Continued)

*Primary Examiner* — Lihong Yu
(74) *Attorney, Agent, or Firm* — Murphy, Bilak & Homilier, PLLC

(57) ABSTRACT

A method, in a radio network node, comprises identifying, among a predetermined codebook of precoding matrix codewords, a subset of precoding matrix codewords that are not to be reported by the wireless device in channel-state-information, CSI, feedback, and transmitting, to the wireless device, a bitmap identifying the subset of precoding matrix codewords that are not to be reported by the wireless device; where each bit in the bitmap corresponds to only one combination of a first dimension index $l'_1$ and a second dimension index $l'_2$ out of the possible combinations of the first dimension index $l'_1$ and the second dimension index $l'_2$, and where the first dimension index $l'_1$ and the second dimension index $l'_2$ identify a two-dimensional beam, the two-dimensional beam being defined by a vector of complex numbers comprised within at least one column of a precoding matrix codeword in the codebook.

20 Claims, 15 Drawing Sheets

Related U.S. Application Data

(60) Provisional application No. 62/251,349, filed on Nov. 5, 2015.

(58) Field of Classification Search
USPC .......................................................... 375/267
See application file for complete search history.

(56) References Cited

U.S. PATENT DOCUMENTS

| | | | | |
|---|---|---|---|---|
| 2012/0082248 | A1* | 4/2012 | Han | H04L 25/03929 375/259 |
| 2014/0016549 | A1 | 1/2014 | Novlan et al. | |
| 2015/0215014 | A1* | 7/2015 | Zhu | H04B 7/0469 375/267 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-384.

Unknown, Author, "Codebook Subset Restriction for Class A FD-MIMO", 3GPP TSG-RAN WG1#82bis, R1-155679, Malmo, Sweden, Oct. 5-9, 2015, 1-9.

Unknown, Author, "Joint Proposal on Rank 2 codebook for Class A CSI reporting", 3GPP TSG RAN WG1 Meeting #82b, R1-156335, Malmo, Sweden, Oct. 5-9, 2015, 1-2.

Unknown, Author, "Joint proposal on rank 3-8codebook", 3GPP TSG RAN WG1 Meeting #83, R1-156390, Anaheim, USA, Oct. 16-20, 2015, 1-8.

Unknown, Author, "RAN1 Chairman's Notes", 3GPP TSG RAN WG1 Meeting #82bis, Beijing, China, Aug. 24-28, 2015, 1-64.

Unknown, Author, "Rank 1-2 codebook for Class A CSI reporting", 3GPP TSG RAN WG1 Meeting #82b, R1-156121, Malmo, Sweden, Oct. 5-9, 2015, 1-14.

Unknown, Author, "WF on class A and class B CSI reporting for Rel.13 EB/FD-MIMO", 3GPP TSG RAN WG1 Meeting #82bis, R1-156217, Malmö, Sweden, Oct. 5-9, 2015, 1-10.

Unknown, Author, "WF on FD-MIMO codebook", 3GPP TSG-RAN WG1#82, R1-154861, Beijing, China, Aug. 24-28, 2015, 1-7.

* cited by examiner

| $i'_2$ | 0 | 1 | 2 | 3 |
|---|---|---|---|---|
|  | $W^{(1)}_{A,B,0}$ | $W^{(1)}_{A,B,1}$ | $W^{(1)}_{A,B,2}$ | $W^{(1)}_{A,B,3}$ |
| $i'_2$ | 4 | 5 | 6 | 7 |
|  | $W^{(1)}_{A+1,B,0}$ | $W^{(1)}_{A+1,B,1}$ | $W^{(1)}_{A+1,B,2}$ | $W^{(1)}_{A+1,B,3}$ |
| $i'_2$ | 8 | 9 | 10 | 11 |
|  | $W^{(1)}_{A+2,B,0}$ | $W^{(1)}_{A+2,B,1}$ | $W^{(1)}_{A+2,B,2}$ | $W^{(1)}_{A+2,B,3}$ |
| $i'_2$ | 12 | 13 | 14 | 15 |
|  | $W^{(1)}_{A+3,B,0}$ | $W^{(1)}_{A+3,B,1}$ | $W^{(1)}_{A+3,B,2}$ | $W^{(1)}_{A+3,B,3}$ |
| $i'_2$ | 16 | 17 | 18 | 19 |
|  | $W^{(1)}_{A,B+1,0}$ | $W^{(1)}_{A,B+1,1}$ | $W^{(1)}_{A,B+1,2}$ | $W^{(1)}_{A,B+1,3}$ |
| $i'_2$ | 20 | 21 | 22 | 23 |
|  | $W^{(1)}_{A+1,B+1,0}$ | $W^{(1)}_{A+1,B+1,1}$ | $W^{(1)}_{A+1,B+1,2}$ | $W^{(1)}_{A+1,B+1,3}$ |
| $i'_2$ | 24 | 25 | 26 | 27 |
|  | $W^{(1)}_{A+2,B+1,0}$ | $W^{(1)}_{A+2,B+1,1}$ | $W^{(1)}_{A+2,B+1,2}$ | $W^{(1)}_{A+2,B+1,3}$ |
| $i'_2$ | 28 | 29 | 30 | 31 |
|  | $W^{(1)}_{A+3,B+1,0}$ | $W^{(1)}_{A+3,B+1,1}$ | $W^{(1)}_{A+3,B+1,2}$ | $W^{(1)}_{A+3,B+1,3}$ |

$A = s_1 i_{1,1} \quad ; \quad B = s_2 i_{1,2}$

*Fig. 15*

| Config | Selected i'₂ indices | $(s_1, s_2)$ |
|---|---|---|
| Config 1 | 0 – 3 | (1,1) |
| Config 2 | 0 – 7, 16 – 23 | (2,2) |
| Config 3 | 0-3, 8-11, 20-23, 28-31 | (2,2) |
| Config 4 | 0 – 15 | (2,2) |

*Fig. 16*

| Config | Selected $i'_2$ indices | (s1,s2) |
|---|---|---|
| Config 1 | 0-1 | (1,1) |
| Config 2 | 0-3, 8-9, 16-19, 22-23, 28-31 | (2,2) |
| Config 3 | 0-1, 4-5, 8-9, 12-13, 18-21, 24-27 | (2,2) |
| Config 4 | 0-15 | (2,2) |

*Fig. 18*

| $i_2'$ | 0 | 1 | 2 | 3 |
|---|---|---|---|---|
| | $W^{(2)}_{A,B,A,B,0}$ | $W^{(2)}_{A,B,A,B,1}$ | $W^{(2)}_{C,B,C,B,0}$ | $W^{(2)}_{C,B,C,B,1}$ |
| $i_2'$ | 4 | 5 | 6 | 7 |
| $i_{1,1}, i_{1,2}$ | $W^{(2)}_{D,B,D,B,0}$ | $W^{(2)}_{D,B,D,B,1}$ | $W^{(2)}_{E,B,E,B,0}$ | $W^{(2)}_{E,B,E,B,1}$ |
| $i_2'$ | 8 | 9 | 10 | 11 |
| $i_{1,1}, i_{1,2}$ | $W^{(2)}_{A,B,C,B,0}$ | $W^{(2)}_{A,B,C,B,1}$ | $W^{(2)}_{C,B,D,B,0}$ | $W^{(2)}_{C,B,D,B,1}$ |
| $i_2'$ | 12 | 13 | 14 | 15 |
| $i_{1,1}, i_{1,2}$ | $W^{(2)}_{A,B,E,B,0}$ | $W^{(2)}_{A,B,E,B,1}$ | $W^{(2)}_{C,B,E,B,0}$ | $W^{(2)}_{C,B,E,B,1}$ |
| $i_2'$ | 16 | 17 | 18 | 19 |
| $i_{1,1}, i_{1,2}$ | $W^{(2)}_{A,F,A,F,0}$ | $W^{(2)}_{A,F,A,F,1}$ | $W^{(2)}_{C,F,C,F,0}$ | $W^{(2)}_{C,F,C,F,1}$ |
| $i_2'$ | 20 | 21 | 22 | 23 |
| $i_{1,1}, i_{1,2}$ | $W^{(2)}_{E,F,E,F,0}$ | $W^{(2)}_{E,F,E,F,1}$ | $W^{(2)}_{A,F,C,F,0}$ | $W^{(2)}_{A,F,C,F,1}$ |
| $i_2'$ | 24 | 25 | 26 | 27 |
| $i_{1,1}, i_{1,2}$ | $W^{(2)}_{C,F,D,F,0}$ | $W^{(2)}_{C,F,D,F,1}$ | $W^{(2)}_{C,F,E,F,0}$ | $W^{(2)}_{C,F,E,F,1}$ |
| $i_2'$ | 28 | 29 | 30 | 31 |
| $i_{1,1}, i_{1,2}$ | $W^{(2)}_{A,B,A,F,0}$ | $W^{(2)}_{A,B,A,F,1}$ | $W^{(2)}_{C,B,C,F,0}$ | $W^{(2)}_{C,B,C,F,1}$ |

$A = s_1 i_{1,1} \quad ; \quad B = s_2 i_{1,2} \quad ; C = s_1 i_{1,1} + p_1$ $D = s_1 i_{1,1} + 2p_1 \quad ; \quad E = s_1 i_{1,1} + 3p_1$ $F = s_2 i_{1,2} + p_2$

*Fig. 17*

| $i'_2$ | 0 | 1 | 2 | 3 |
|---|---|---|---|---|
| $i_{1,1}, i_{1,2}, k$ | $W^{(3)}_{A,A+\delta_1,B,B+\delta_2}$ | $W^{(3)}_{A+\delta_1,A,B+\delta_2,B}$ | $\widetilde{W}^{(3)}_{A,A+\delta_1,B,B+\delta_2}$ | $\widetilde{W}^{(3)}_{A+\delta_1,A,B+\delta_2,B}$ |
| $i'_2$ | 4 | 5 | 6 | 7 |
| $i_{1,1}, i_{1,2}, k$ | $W^{(3)}_{C,C+\delta_1,B,B+\delta_2}$ | $W^{(3)}_{C+\delta_1,C,B+\delta_2,B}$ | $\widetilde{W}^{(3)}_{C,C+\delta_1,B,B+\delta_2}$ | $W\widetilde{W}^{(3)}_{C+\delta_1,C,B+\delta_2,B}$ |
| $i'_2$ | 8 | 9 | 10 | 11 |
| $i_{1,1}, i_{1,2}, k$ | $W^{(3)}_{D,D+\delta_1,B,B+\delta_2}$ | $W^{(3)}_{D+\delta_1,D,B+\delta_2,B}$ | $\widetilde{W}^{(3)}_{D,D+\delta_1,B,B+\delta_2}$ | $\widetilde{W}^{(3)}_{D+\delta_1,D,B+\delta_2,B}$ |
| $i'_2$ | 12 | 13 | 14 | 15 |
| $i_{1,1}, i_{1,2}, k$ | $W^{(3)}_{E,E+\delta_1,B,B+\delta_2}$ | $W^{(3)}_{E+\delta_1,E,B+\delta_2,B}$ | $\widetilde{W}^{(3)}_{E,E+\delta_1,B,B+\delta_2}$ | $\widetilde{W}^{(3)}_{E+\delta_1,E,B+\delta_2,B}$ |
| 16 – 31 | | | | |
| Entries 16-31 constructed by replacing B in third and fourth subscripts of entries 0-15 with B+$p_2$ | | | | |

| $i_2'$ | 0 | 1 | 2 | 3 |
|---|---|---|---|---|
| $i_{1,1}, i_{1,2}, k$ | $W^{(4)}_{A,A+\delta_1,B,B+\delta_2,0}$ | $W^{(4)}_{A,A+\delta_1,B,B+\delta_2,1}$ | $W^{(4)}_{C,C+\delta_1,B,B+\delta_2,0}$ | $W^{(4)}_{C,C+\delta_1,B,B+\delta_2,1}$ |
| $i_2'$ | 4 | 5 | 6 | 6 |
| $i_{1,1}, i_{1,2}, k$ | $W^{(4)}_{C,C+\delta_1,B,B+\delta_2,0}$ | $W^{(4)}_{C,C+\delta_1,B,B+\delta_2,1}$ | $W^{(4)}_{E,E+\delta_1,B,B+\delta_2,0}$ | $W^{(4)}_{E,E+\delta_1,B,B+\delta_2,1}$ |
| 8 – 15 | Entries 8-15 constructed by replacing B in third and fourth subscripts of entries 0-7 with B+$p_2$ | | | |

$$W^{(5)}_{i_{1,1},i_{1,2}} = \frac{1}{\sqrt{5Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,2}} \otimes u_{s_2 i_{1,2}+\delta_{2,2}} \end{bmatrix}$$

(Eq. 11)

$$W^{(6)}_{i_{1,1},i_{1,2}} = \frac{1}{\sqrt{6Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & -v_{s_1 i_{1,1}+\delta_{1,1}} \otimes u_{s_2 i_{1,2}+\delta_{2,1}} & -v_{s_1 i_{1,1}+\delta_{1,2}} \otimes u_{s_2 i_{1,2}+\delta_{2,2}} \end{bmatrix}$$

$$W^{(7)}_{i_{1,1},i_{1,2}} = \frac{1}{\sqrt{7Q}} \begin{bmatrix} v_{s_1 t_{1,1}} \otimes u_{s_2 t_{1,2}} & v_{s_1 t_{1,1}} \otimes u_{s_2 t_{1,3}} & v_{s_1 t_{1,2}+\delta_{1,2}} \otimes u_{s_2 t_{1,2}+\delta_{2,2}} & v_{s_1 t_{1,1}+\delta_{1,1}} \otimes u_{s_2 t_{1,2}+\delta_{2,1}} & v_{s_1 t_{1,2}+\delta_{1,2}} \otimes u_{s_2 t_{1,2}+\delta_{2,2}} & v_{s_1 t_{1,1}+\delta_{1,1}} \otimes u_{s_2 t_{1,2}+\delta_{2,1}} & v_{s_1 t_{1,2}+\delta_{1,2}} \otimes u_{s_2 t_{1,2}+\delta_{2,3}} \\ v_{s_1 t_{1,1}} \otimes u_{s_2 t_{1,2}} & -v_{s_1 t_{1,1}} \otimes u_{s_2 t_{1,3}} & v_{s_1 t_{1,1}+\delta_{1,2}} \otimes u_{s_2 t_{1,2}+\delta_{2,2}} & -v_{s_1 t_{1,1}+\delta_{1,1}} \otimes u_{s_2 t_{1,2}+\delta_{2,1}} & v_{s_1 t_{1,2}+\delta_{1,2}} \otimes u_{s_2 t_{1,2}+\delta_{2,2}} & v_{s_1 t_{1,1}+\delta_{1,1}} \otimes u_{s_2 t_{1,2}+\delta_{2,1}} & \otimes u_{s_2 t_{1,2}+\delta_{2,3}} \end{bmatrix}$$

(Eq. 11)

$$W^{(8)}_{i_{1,1},i_{1,2}} = \frac{1}{\sqrt{8Q}} \begin{bmatrix} v_{s_1 t_{1,1}} \otimes u_{s_2 t_{1,3}} & v_{s_1 t_{1,1}} \otimes u_{s_2 t_{1,3}} & v_{s_1 t_{1,2}+\delta_{1,2}} \otimes u_{s_2 t_{1,2}+\delta_{2,1}} & v_{s_1 t_{1,1}+\delta_{1,1}} \otimes u_{s_2 t_{1,3}+\delta_{2,3}} & v_{s_1 t_{1,2}+\delta_{1,2}} \otimes u_{s_2 t_{1,3}+\delta_{2,3}} & v_{s_1 t_{1,1}+\delta_{1,1}} \otimes u_{s_2 t_{1,3}+\delta_{2,3}} & v_{s_1 t_{1,2}+\delta_{1,2}} \otimes u_{s_2 t_{1,2}+\delta_{2,3}} \\ v_{s_1 t_{1,1}} \otimes u_{s_2 t_{1,3}} & -v_{s_1 t_{1,1}} \otimes u_{s_2 t_{1,3}} & v_{s_1 t_{1,1}+\delta_{1,1}} \otimes u_{s_2 t_{1,1}+\delta_{2,1}} & -v_{s_1 t_{1,1}+\delta_{1,1}} \otimes u_{s_2 t_{1,2}+\delta_{2,2}} & v_{s_1 t_{1,2}+\delta_{1,2}} \otimes u_{s_2 t_{1,3}+\delta_{2,3}} & -v_{s_1 t_{1,1}+\delta_{1,1}} \otimes u_{s_2 t_{1,3}+\delta_{2,3}} & \otimes u_{s_2 t_{1,2}+\delta_{2,3}} \end{bmatrix}$$

CODEBOOK SUBSET RESTRICTION FOR FULL-DIMENSION MIMO

TECHNICAL FIELD

Embodiments herein relate to wireless communications in general and in particular to methods and apparatuses for managing precoder codeword selection in wireless systems supporting full-dimension multiple-input multiple-output (FD-MIMO) transmission schemes.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

LTE uses Orthogonal Frequency-Division Multiplexing (OFDM) in the downlink and Discrete-Fourier-Transform-spread (DFT-spread) OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 milliseconds, as shown in FIG. 2, with each radio frame consisting of ten equally-sized subframes of length Tsubframe=1 millisecond. For normal cyclic prefix, one subframe consists of fourteen OFDM symbols. The duration of each OFDM symbol is approximately 71.4 microseconds (µs).

Furthermore, the resource allocation in LTE is typically described in terms of resource blocks, where a resource block corresponds to one slot (0.5 ms) in the time domain and twelve contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about to which terminals data is transmitted and within which resource blocks the data is transmitted, in the current downlink subframe. This control signaling (PDCCH) is typically transmitted in the first one, two, three, or four OFDM symbols in each subframe and the number n=1, 2, 3 or 4 is known as the Control Format Indicator (CFI). The downlink subframe also contains common reference symbols, which are known to the receiver and used for coherent demodulation of the control information, for example. A portion of a downlink subframe with CFI=3 OFDM symbols as control is illustrated in FIG. 3.

From Release 11 of the 3GPP specifications for LTE (LTE Rel-11) onwards, the above described resource assignments can be scheduled on the Enhanced Physical Downlink Control Channel (EPDCCH) as well as on the Physical Downlink Control Channel (PDCCH). For Rel-8 LTE to Rel-10 LTE, only the PDCCH is used for this purpose.

The reference symbols shown in FIG. 3 are the cell-specific reference symbols (CRS) and are used to support multiple functions including fine time and frequency synchronization and channel estimation for certain transmission modes.

In a cellular communication system there is a need to measure the channel conditions, in order to know what transmission parameters to use. These parameters include, e.g., modulation type, coding rate, transmission rank, and frequency allocation. This applies to uplink (UL) as well as downlink (DL) transmissions.

The scheduler that makes the decisions on the transmission parameters is typically located in the base station (referred to in 3GPP documentation as an "eNB"). Hence, it can measure channel properties of the UL directly using known reference signals that the terminals (referred to in 3GPP documentation as "user equipment" or "UEs") transmit. These measurements then form a basis for the UL scheduling decisions that the eNB makes, which are then sent to the UEs via a downlink control channel.

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

The LTE standard is currently evolving to include enhanced MIMO support. A core component in LTE is the support of MIMO antenna deployments and MIMO related techniques. Currently, LTE-Advanced supports an 8-layer spatial multiplexing mode for eight transmit (Tx) antennas, with channel dependent precoding. The spatial multiplexing mode is aimed for high data rates in favorable channel conditions. An illustration of the transmission structure for precoded spatial-multiplexing operation is provided in FIG. 4.

As seen in FIG. 4, the information carrying symbol vector s is multiplied by an $N_T \times r$ precoder matrix W, which serves to distribute the transmit energy in a subspace of the $N_T$-dimensional vector space, where $N_T$ is the number of transmitting antenna ports. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer, and r is referred to as the transmission rank. In this way, spatial multiplexing is achieved, since multiple symbols can be transmitted simultaneously over the same time/frequency resource element (TFRE). The number of symbols r is typically adapted to suit the current channel properties.

As noted above, LTE uses OFDM in the downlink (and DFT-precoded OFDM in the uplink), and hence the received $N_R \times 1$ vector $y_n$ for a certain TFRE on subcarrier n (or alternatively data TFRE number n) is modeled by:

$$y_n = H_n W s_n + e_n$$

where $N_R$ is the number of receiver antenna ports and $e_n$ is a noise/interference vector obtained as realizations of a random process. The precoder W can be a wideband precoder, which is constant over frequency, or frequency selective.

The precoder matrix is often chosen to match the characteristics of the $N_R \times N_T$ MIMO channel matrix $H_n$, resulting in so-called channel-dependent precoding. This is also commonly referred to as closed-loop precoding, and essentially strives to focus the transmit energy into a subspace that is strong, in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected.

In LTE Release-10, a new reference symbol sequence or reference signal, referred to as CSI-RS, was introduced for purposes of estimating channel state information (CSI). The CSI-RS provides several advantages over basing CSI feedback on the common or cell-specific reference symbols (CRS) which were used for that purpose in previous releases. Firstly, the CSI-RS is not used for demodulation of the data signal, and thus does not require the same density, i.e., the overhead of the CSI-RS is substantially less than that of the CRS. Secondly, CSI-RS provides a much more flexible means to configure CSI feedback measurements (e.g., which CSI-RS resource to measure on can be configured in a UE specific manner).

By measuring on a CSI-RS, a UE can estimate the effective channel the CSI-RS is traversing, where the effective channel includes the radio propagation channel and antenna gains. In more mathematical rigor this implies that if a known CSI-RS signal x is transmitted, a UE can estimate the coupling between the transmitted signal and the received signal, i.e., the effective channel. Hence, if no virtualization is performed in the transmission, the received signal y can be expressed as:

$$y = Hx + e$$

and the UE can estimate the effective channel H.

Up to eight CSI-RS ports can be configured for a Rel-11 UE, which means that the UE can thus estimate the channel from up to eight transmit antennas.

For CSI feedback, LTE has adopted an implicit CSI mechanism where a UE does not explicitly report, e.g., the complex-valued elements of a measured effective channel, but rather the UE recommends a transmission configuration for the measured effective channel. The recommended transmission configuration thus implicitly gives information about the underlying channel state.

In LTE, CSI feedback is given in terms of a transmission rank indicator (RI), a precoder matrix indicator (PMI), and one or two channel quality indicator(s) (CQI). The CQI/RI/PMI report can be wideband or frequency selective, depending on which reporting mode is configured.

The RI corresponds to a recommended number of streams that are to be spatially multiplexed and thus transmitted in parallel over the effective channel. The PMI identifies a recommended precoding matrix codeword (in a codebook which contains precoders with the same number of rows as the number of CSI-RS ports) for the transmission, which relates to the spatial characteristics of the effective channel. The CQI represents a recommended transport block size, i.e., code rate, and LTE supports transmission of one or two simultaneous transmissions of transport blocks on each of up to four different layers, i.e., separately encoded blocks of information, to a UE in a subframe. There is thus a relation between a CQI and an SINR of the spatial stream(s) over which the transport block or blocks are transmitted.

Recent development in 3GPP has led to the discussion of two-dimensional antenna arrays where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. An example of an antenna array where $N_h=4$ and $N_v=8$ is illustrated in FIG. 5. This array furthermore consists of cross-polarized antenna elements, meaning that $N_p=2$. We will denote such an antenna as an 8×4 antenna array with cross-polarized antenna elements. Note that the right-hand side of FIG. 5 shows an example antenna port layout corresponding to the same antenna array, with 2 vertical ports and 4 horizontal ports. This could be obtained, for instance, by virtualizing each port with 4 vertical antenna elements, i.e., mapping outputs from 4 vertical antenna elements to each of the ports shown on the right-hand side of FIG. 5. Hence, assuming cross-polarized ports are present, the UE can measure CSI-RS for 16 antenna ports, in this example.

Precoding may be interpreted as multiplying the signal with different beamforming weights for each antenna port prior to transmission. A typical approach is to tailor the precoder to the antenna form factor, i.e., taking into account $N_1$, $N_2$ and $N_p$ when designing the precoder codebook.

A common approach when designing precoder codebooks tailored for two-dimensional antenna arrays is to combine precoders tailored for a horizontal array and a vertical array of antenna ports, respectively, by means of a Kronecker product. A precoding matrix W in the codebook is then represented as:

$$W = W_1 W_2, \quad \text{(Eq. 1)}$$

where $W_1$ is defined as:

$$W_1 = \begin{pmatrix} X_1 \otimes X_2 & 0 \\ 0 & X_1 \otimes X_2 \end{pmatrix}, \quad \text{(Eq. 2)}$$

wherein:

$X_1$ is a $N_1 \times L_1$ matrix (corresponding to a beam group) with $L_1$ column vectors which are constructed using $O_1$ times oversampled Discrete-Fourier-Transform (DFT) vectors $v_l$ of length $N_1$:

$$v_l = \begin{bmatrix} 1 & e^{\frac{j2\pi l}{N_1 O_1}} & \ldots & e^{\frac{j2\pi(N_1-1)l}{N_1 O_1}} \end{bmatrix}^T;$$

$X_2$ is a $N_2 \times L_2$ matrix (corresponding to a beam group) with $L_2$ column vectors which are constructed using $O_2$ times oversampled DFT vectors $u_l$ of length $N_2$:

$$u_l = \begin{bmatrix} 1 & e^{\frac{j2\pi l}{N_2 O_2}} & \ldots & e^{\frac{j2\pi(N_2-1)l}{N_2 O_2}} \end{bmatrix}^T;$$

$N_1$ and $N_2$ are the numbers of antenna ports per polarization in a first dimension (e.g., horizontal) and in a second dimension (e.g., vertical), respectively;

$L_1$ and $L_2$ are referred to as the beam group sizes of the first and second dimensions, respectively; and $[\ ]^T$ denotes the transpose operation.

The matrix $W_2$ in Eq. 1 selects beams from these beam groups (in the two dimensions). $W_2$ may operate per subband, to enable fast beam selection (per subband) across the system bandwidth.

In Rel-13 LTE, class A CSI reporting refers to the case where the UE reports CSI using non-precoded CSI reference symbols or signals in both the first and second dimensions. In Rel-13, parameterized codebooks for 12 and 16 ports are supported, in addition to a two-dimensional 8-port codebook. The Rel-13 class A codebook is configured with five Radio Resource Control (RRC) configured parameters:

The numbers $N_1$, $N_2$ of antenna ports per polarization in each dimension; $N_1$, $N_2$ E {1,2,3,4,8}, where the valid candidates are $(N_1, N_2)$=(8,1), (2,2), (2,3), (3,2), (2,4), (4,2)

The oversampling factors $O_1$, $O_2$ in each dimension; For each $(N_1, N_2)$, configurability of $(O_1, O_2)$ is restricted to two possible fixed pairs as given below:

| $(N_1, N_2)$ | $(O_1, O_2)$ combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

A configuration parameter Config that can take on values of 1, 2, 3, or 4.

It should be noted that for the case(s) where one dimension has a single port, the oversampling factor (for that dimension), and Config values of 2 and 3 do not apply.

Rank-1 Class A Codebook

Given the set of values $N_1$, $N_2$, $O_1$, and $O_2$, the $W_1$ matrices in Eq. 1 and Eq. 2 are constructed with:

$$(L'_1, L'_2) = \begin{cases} (4, 2), & \text{if } N_1 \geq N_2 \\ (2, 4), & \text{else } N_1 < N_2 \end{cases} \quad \text{(Eq. 3)}$$

where $L'_1$ and $L'_2$ are the number of columns in $X_1$ and $X_2$, respectively. The values of $L'_1$ and $L'_2$ are first chosen such that $L'_1 > L_1$ and $L'_2 > L_2$, to form an extended codebook.

Depending on the value of Config, a subset of codewords from the extended codebook is selected as an active subset, i.e. used in CSI feedback, as follows:

Config=1: $(L_1,L_2)$=(1,1)
Config=2: $(L_1,L_2)$=(2,2) [square]
Config=3: $(L_1,L_2)$=(2,2) [non-adjacent two-dimensional beams/checkerboard]

$$\text{Config} = 4: (L_1, L_2) = \begin{cases} (4, 1), & \text{if } N_1 \geq N_2 \\ (1, 4), & \text{else } N_1 < N_2 \end{cases}$$

Hence, config 2-4 contains four beams per beam group while config 1 only contains a single beam per beam group. Let $i_{1,1}=0, 1, \ldots, O_1N_1/s_1-1$ and $i_{1,2}=0, 1, \ldots, O_2N_2/s_2-1$ denote the first PMI index in dimension 1 and 2, respectively. Here, $s_1$ and $s_2$ represent beam group spacing, or how far apart the beam groups can be in angle, in dimension 1 and 2, respectively. From the active subset of codewords described above, the UE selects one codeword and reports this selection via a second PMI $i'_2$ in aperiodic reporting on PUSCH. Hence, the rank-1 codebook can be defined in terms of $i_{1,1}$, $i_{1,2}$, and $i'_2$ as shown in the table illustrated in FIG. 15, which shows a Rank-1 Class A Codebook for $N_1 \geq N_2$.

In FIG. 15, each rank-1 codeword $W_{m_1,m_2,n}^{(1)}$ is defined as $$W_{m_1,m_2,n}^{(1)} = \frac{1}{\sqrt{Q}} \begin{bmatrix} v_{m_1} \otimes u_{m_2} \\ \varphi_n v_{m_1} \otimes u_{m_2} \end{bmatrix}, \quad \text{(Eq. 4)}$$

wherein $\varphi_n = e^{j\pi n/2}$. In Eq. 4, the single layer of data is transmitted on the two-dimensional beam involving the $m_1^{th}$ beam in the first dimension and the $m_2^{th}$ beam in the second dimension, where:

$$v_{m_1} = \begin{bmatrix} 1 & e^{j\frac{2\pi m_1}{O_1 N_1}} & \cdots & e^{j\frac{2\pi m_1(N_1-1)}{O_1 N_1}} \end{bmatrix}^T, \quad \text{(Eq. 5)}$$

$$u_{m_2} = \begin{bmatrix} 1 & e^{j\frac{2\pi m_2}{O_2 N_2}} & \cdots & e^{j\frac{2\pi m_2(N_2-1)}{O_2 N_2}} \end{bmatrix}^T, \quad \text{(Eq. 6)}$$

and where the superscript T indicates matrix transpose.

For each Config value, the different possible values of $i'_2$ and the associated values of $s_1$ and $s_2$ are given in the table shown in FIG. 16, which shows the election of $i'_2$ and $(s_1,s_2)$ for Rank-1 Class A Codebook.

This codebook can be interpreted as follows: The left column in the table shown in FIG. 16 describes how the beams in the beam group are distributed across the first and second dimension. The indices $i_{1,1}$ and $i_{1,2}$ in in the table shown in FIG. 15 are wideband, and used to select the beams in the beam group. The index $i'_2$ is used to perform beam selection within the beam group (as selected by $i_{1,1}$ and $i_{1,2}$) and co-phasing of the beams in the different polarizations. The parameters $s_1$ and $s_2$ indicate the shift between different beam groups. For instance, the table shown in FIG. 15 shows that given $i_{1,1}$, the indices for the first dimension are $s_i i_{1,1}$, $s_1 i_{1,1}+1$, $s_1 i_{1,1}+2$, $s_1 i_{1,1}+3$, while the table shown in FIG. 16 shows that for Config 2, only $i'_2$ indices (0-7, 16-23) can be selected, hence only $s_1 i_{1,1}$, $s_1 i_{1,1}+1$ can be selected for this configuration. Effectively, the beam group size of the first dimension in Config 2 is two, i.e. $L_1=2$.

Rank-2 Class A Codebook

Given the set of values $N_1$, $N_2$, $O_1$, and $O_2$, the $W_1$ matrices in Eqs. 1 and 2 are constructed in the same manner described above (i.e., using the same values of $(L'_1, L'_2)$ defined in Eq. 3). The rank-2 codebook can be defined in terms of $i_{1,1}$, $i_{1,2}$, and $i'_2$ as shown in the table shown in FIG. 17. In the table shown in FIG. 17, each rank-2 codeword $W_{m_1,m'_1,m_2,m'_2,n}^{(2)}$ is defined as $$W_{m_1,m_2,m'_1,m'_2,n}^{(2)} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}, \quad \text{(Eq. 7)}$$

wherein $\varphi_n = e^{j\pi n/2}$. In Eq. 7, the first layer of data is transmitted on the two-dimensional beam involving the $m_1^{th}$ beam in the first dimension and the $m_2^{th}$ beam in the second dimension; the second layer of data is transmitted on the two-dimensional beam involving the $(m'_1)^{th}$ beam in the first dimension and the $(m'_2)^{th}$ beam in the second dimension. Furthermore, $i_{1,1}$, $i_{1,2}$, and the beam offsets $p_1$, and $p_2$ in the table shown in FIG. 17, which illustrates a Rank 2 Class A Codebook, are defined as:

$i_{1,1}=0, 1, \ldots, O_1N_1/s_1-1$
$i_{1,2}=0, 1 \ldots, O_2N_2/s_2-1$
$p_1=1$ and $p_2=1$.

For each Config value, the different possible values of $i'_2$ and the associated values of $s_1$ and $s_2$ corresponding to the rank-2 Class A codebook are given in the table shown in FIG. 18.

In the table shown in FIG. 18, which shows selection of $i'_2$ and $(s_1,s_2)$ for Rank 2 Class A Codebook, two-dimensional beams are indicated by square shaped boxes. A square box with indices a'b' in the first dimension (e.g., horizontal) and indices c'd' in the second dimension (e.g., vertical) corresponds to any codeword from the table shown in FIG. 18 that satisfies the conditions $m_1=s_1i_{1,1}+a'$, $m_2=s_2i_{1,2}+c'$, $m'_1=s_1i_{1,1}+b'$, and $m'_2=s_2i_{1,2}+d'$. For each Config value, the shaded, dashed and crossed boxes represent the two-dimensional beams that can be used to form the active subset of codewords from the extended codebook table.

Rank-3 Class A Codebook

The rank-3 codebook can be defined in terms of four parameters: $i_1$, $i_{1,2}$, k and $i'_2$. The different parameter values of parameter k represent different orthogonal beam groups. Each beam group consists of $L'_1$ beams in the first dimension and $L'_2$ beams in the second dimension where $(L'_1,L'_2)$ are defined in Eq. 3. During feedback, the UE feeds back k as part of the $W_1$ indication. Each k value corresponds to one pair of $(\delta_1,\delta_2)$ parameters as shown in Table 1. There can be two alternatives for the maximum value of k:

Alt 1. Two values: k=0, 1 in Table 1
Alt 2. Maximum eight values:
If $N_1>1$ and $N_2>1$: k=0, 1, 2 . . . , 7 in Table 1
If $N_2=1$: k=0, 1, 2 Table 1

TABLE 1

Mapping between k and $(\delta_1, \delta_2)$

| | | k | | | | | | | |
|---|---|---|---|---|---|---|---|---|---|
| | δ | 0 | 1 | 2 | 3 | 4 | 5 | 6 | 7 |
| If $N_1>1$ and $N_2>1$ | $\delta_1$ | $O_1$ | 0 | $O_1$ | $2O_1$ | 0 | $O_1$ | $2O_1$ | $2O_1$ |
| | $\delta_2$ | 0 | $O_2$ | $O_2$ | 0 | $2O_2$ | $2O_2$ | $O_2$ | $2O_2$ |
| If $N_2=1$ | $\delta_1$ | $O_1$ | $2O_1$ | $3O_1$ | | | | | |
| | $\delta_2$ | 0 | 0 | 0 | | | | | |

Furthermore, $i_{1,1}$ and $i_{1,2}$, are defined as:
$i_{1,1}=0, 1, \ldots, O_1N_1/s_1-1$
$i_{1,2}=0, 1, \ldots, O_2N_2/s_2-1$.

Then, the rank-3 codebook can be defined as shown in the table shown in FIG. 19, which shows a Rank 3 Class A Codebook. In the table shown in FIG. 19, the rank-3 codewords $W^{(3)}_{m_1,m'_1,m_2,m'_2}$ and $\tilde{W}^{(3)}_{m_1,m'_1,m_2,m'_2}$ indexed by $i'_2$ are defined as:

$$W^{(3)}_{m_1,m'_1,m_2,m'_2} = \frac{1}{\sqrt{3Q}} \begin{bmatrix} v_{m_1} \otimes u_{m_2} & v_{m'_1} \otimes u_{m'_2} & v_{m'_1} \otimes u_{m'_2} \\ v_{m_1} \otimes u_{m_2} & -v_{m_1} \otimes u_{m_2} & -v_{m'_1} \otimes u_{m'_2} \end{bmatrix}, \quad \text{(Eq. 8)}$$

$$\tilde{W}^{(3)}_{m_1,m'_1,m_2,m'_2} = \frac{1}{\sqrt{3Q}} \begin{bmatrix} v_{m_1} \otimes u_{m_2} & v_{m'_1} \otimes u_{m'_2} & v_{m'_1} \otimes u_{m'_2} \\ v_{m_1} \otimes u_{m_2} & v_{m'_1} \otimes u_{m'_2} & -v_{m'_1} \otimes u_{m'_2} \end{bmatrix}. \quad \text{(Eq. 9)}$$

For each Config value, the different possible values of $i'_2$ and the associated values of $(s_1,s_2)$ and $(p_1,p_2)$ corresponding to the rank-3 class A codebook are given in Table 2.

TABLE 2

Selection of $i'_2$, $(s_1, s_2)$, and $(p_1, p_2)$ for Rank-3 Class A Codebook

| Config | Selected $i'_2$ indices | $(s_1, s_2)$ | $(p_1, p_2)$ |
|---|---|---|---|
| 1 | 0, 2 | (1, 1) | (—, —) |
| 2 | 0-7, 16-23 | $(O_1, O_2)$ | $\left(\frac{O_1}{2}, \frac{O_2}{2}\right)$ |
| 3 | 0-3, 8-11, 20-23, 28-31 | $(O_1, O_2)$ | $\left(\frac{O_1}{4}, \frac{O_2}{2}\right)$ |
| 4 | 0-15 | $\left(O_1, \frac{O_2}{2}\right)$ | $\left(\frac{O_1}{4}, —\right)$ |

Rank-4 Class A Codebook

The rank-4 codebook can be defined in terms of four parameters: $i_{1,1}$, $i_{1,2}$, k and $i'_2$. The different parameter values of parameter k represent different orthogonal beam groups. Each beam group consists of $L'_1$ beams in the first dimension and $L'_2$ beams in the second dimension, where $(L'_1,L'_2)$ are defined in Eq. 3. During feedback, the UE feeds back k as part of the $W_1$ indication. Each k value corresponds to one pair of $(\delta_1,\delta_2)$ parameters as shown in Table 1. There can be two alternatives for the maximum value of k:

Alt 1. Two values: k=0, 1 in Table 1
Alt 2. Maximum eight values:
If $N_1>1$ and $N_2>1$: k=0, 1, 2 . . . , 7 in Table 1
If $N_2=1$: k=0, 1, 2 in Table 1

Furthermore, $i_{1,1}$ and $i_{1,2}$, are defined as:
$i_{1,1}=0, 1, \ldots, O_1N_1/s_1-1$
$i_{1,2}=0, 1, \ldots, O_2N_2/s_2-1$ Then, the rank-4 codebook can be defined as shown in the table shown in FIG. 20. In the table shown in FIG. 20, which shows a Rank 4 Class A Codebook, the rank-4 codewords $W^{(4)}_{m_1,m'_1,m_2,m'_2,n}$ indexed by $i'_2$ are defined as:

$$W^{(4)}_{m_1,m'_1,m_2,m'_2,n} = \frac{1}{\sqrt{4Q}} \begin{bmatrix} v_{m_1} \otimes u_{m_2} & v_{m'_1} \otimes u_{m'_2} & v_{m_1} \otimes u_{m_2} & v_{m'_1} \otimes u_{m'_2} \\ \varphi_n v_{m_1} \otimes u_{m_2} & \varphi_n v_{m'_1} \otimes u_{m'_2} & -\varphi_n v_{m_1} \otimes u_{m_2} & -\varphi_n v_{m'_1} \otimes u_{m'_2} \end{bmatrix}. \quad \text{(Eq. 10)}$$

For each Config value, the different possible values of $i'_2$ and the associated values of $(s_1,s_2)$ and $(p_1, p_2)$ corresponding to the rank-4 class A codebook are given in Table 3.

TABLE 3

Selection of $i'_2$, $(s_1, s_2)$, and $(p_1, p_2)$ for Rank-4 Class A Codebook

| Config | Selected $i'2$ indices | $(s_1,s_2)$ | $(p_1, p_2)$ |
|---|---|---|---|
| 1 | 0, 1 | (1,1) | (—, —) |
| 2 | 0-3, 8-11 | $(O_1,O_2)$ | $\left(\frac{O_1}{2}, \frac{O_2}{2}\right)$ |
| 3 | 0-1, 4-5, 10-11, 14-15 | $(O_1, O_2)$ | $\left(\frac{O_1}{4}, \frac{O_2}{2}\right)$ |
| 4 | 0-7 | $\left(O_1, \frac{O_2}{2}\right)$ | $\left(\frac{O_1}{4}, —\right)$ |

Ranks 5-8 Class A Codebooks

For ranks 5-8, the Class A codebooks are defined by two parameters: $\{i_{11},i_{12}\}$. The $i_{1,1}$ and $i_{1,2}$ parameters are defined as:

$i_{1,1}=0,1,\ldots,O_1N_1/s_1-1$ $i_{1,2}=0,1,\ldots,O_2N_2/s_2-1$

For a given Config, $(s_1, s_2)$ values are determined similar to Table 3. A precoding matrix codeword for rank r (r=5, 6, 7, 8) is denoted as $W_{1_{1,1}, i_{1,2}}^{(r)}$. The precoding matrix codewords $W_{1_{1,1}, i_{1,2}}^{(r)}$, r=5, 6, 7, 8 are then defined as in Equations 11-14, illustrated in FIG. 21 and FIG. 22.

For sixteen ports (i.e., $N_1 N_2 = 8$), the terms $\delta_{1,1}, \delta_{1,2}, \delta_{1,3}, \delta_{2,1}, \delta_{2,2}, \delta_{2,3}$ in Equations 11-14 are defined as in Table 4. For twelve ports (i.e., $N_1 N_2 = 6$), the terms $\delta_{1,1}, \delta_{1,2}, \delta_{1,3}, \delta_{2,1}, \delta_{2,2}, \delta_{2,3}$ in Equations 11-14 are defined as in Table 5.

TABLE 4

Delta values for cases with 16 ports and ranks 5-8

| | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 4 | $N_1 \geq N_2$ | $O_1$ | 0 | $2O_1$ | 0 | $3O_1$ | 0 |
| | $N_1 < N_2$ | 0 | $O_2$ | 0 | $2O_2$ | 0 | $3O_2$ |
| Config = 3 | $N_1 \geq N_2$ | $O_1$ | 0 | $2O_1$ | $O_2$ | $3O_1$ | $O_2$ |
| | $N_1 < N_2$ | 0 | $O_2$ | $O_1$ | $2O_2$ | $O_1$ | $3O_2$ |
| Config = 2 | Both | $O_1$ | 0 | $O_1$ | $O_2$ | 0 | $O_2$ |

TABLE 5

Delta values for cases with 12 ports and ranks 5-8

| Type | Configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 4 | $N_1 \geq N_2$ | $O_1$ | 0 | $2O_1$ | 0 | 0 | $O_2$ |
| | $N_1 < N_2$ | 0 | $O_2$ | 0 | $2O_2$ | $O_1$ | 0 |
| Config = 3 | $N_1 \geq N_2$ | $O_1$ | 0 | $O_1$ | $O_2$ | $2O_1$ | $O_2$ |
| | $N_1 < N_2$ | 0 | $O_2$ | $O_1$ | $O_2$ | $O_1$ | $2O_2$ |
| Config = 2 | Both | $O_1$ | 0 | $O_1$ | $O_2$ | 0 | $O_2$ |

Codebook Subset Restriction

Codebook subset restriction (CSR) is supported in LTE, as of Release 12 of the 3GPP specifications, and is described in 3GPP TS 36.213 V12.3.0 and 3GPP TS 36.331 V12.3.0. With codebook subset restriction, a subset of the precoders in the codebook is restricted so that the UE has a smaller set of possible precoders to choose from. This effectively reduces the size of the codebook implying that the search for the best PMI can be done on the smaller unrestricted set of precoders, thereby also reducing the UE computational requirements for this particular search. Typically, the eNodeB would signal the codebook subset restriction to the UE by means of a bitmap in a dedicated message part of the AntennaInfo information element, one bit for each precoder in the codebook, where a 1 indicates that the precoder is restricted, meaning that the UE is not allowed to choose and report the precoder. Thus, for a codebook with $A_c$ different codewords across all ranks, a bitmap of length $A_c$ would be used to signal the codebook subset restriction. The number of bits $A_c$ associated with different codebooks for different transmission modes is shown in Table 6 below. This allows for full flexibility for the eNodeB to restrict every possible subset of the codebook. There are thus $2^{A_c}$ possible codebook subset restriction configurations. For large antenna arrays with many antenna elements, the effective beams become narrow and a codebook containing many precoders is required for the intended coverage area. Furthermore, for two-dimensional antenna arrays, the codebook size increases quadratically since the precoders in the codebook need to span two dimensions, typically the horizontal and vertical domain. Thus, the codebook size, i.e. the total number of possible precoding matrices W, can be very large. Signaling a codebook subset restriction in the LTE pre-release-13 way, by means of a bitmap with one bit for every precoder, can thus impose a large overhead, especially if the codebook subset restriction (CSR) is frequently updated or if there are many users served by the cell where each UE has to receive the CSR.

TABLE 6

Number of bits in codebook subset restriction bitmap for applicable transmission modes

| | Number of bits $A_c$ | | |
|---|---|---|---|
| | 2 antenna ports | 4 antenna ports | 8 antenna ports |
| Transmission mode 3 | 2 | 4 | |
| Transmission mode 4 | 6 | 64 | |
| Transmission mode 5 | 4 | 16 | |
| Transmission mode 6 | 4 | 16 | |
| Transmission mode 8 | 6 | 64 with alternativeCodeBookEnabledFor4TX-r12 = TRUE configured, otherwise 32 | |
| Transmission modes 9 and 10 | 6 | 96 with alternativeCodeBookEnabledFor4TX-r12 = TRUE configured, otherwise 64 | 109 |

To address the shortcomings of the legacy CSR, two-dimensional beam-based codebook subset restriction will be implemented in LTE Rel-13. Let $(l_1, l_2)$ denote the two-dimensional beam in $X_1 \otimes X_2$ corresponding to the $l_1^{th}$ DFT vector in the first dimension, e.g., horizontal dimension, and $l_2^{th}$ DFT vector in the second dimension, e.g., vertical dimension. Then, codebook subset restriction (CSR) is supported for FD-MIMO, where:
  CSR is configured via RRC signaling
  A subset of two-dimensional beams $(l_1, l_2)$ are forbidden, i.e., not allowed to be reported according to the CSR configuration
  A forbidden two-dimensional beam is not allowed in reporting with any rank
  Rank restriction is also supported
  CSR can be also applied to $W_2$
  Number of PMI bits does not vary according to restricted subset
    Note: Codebook subset restriction targets e.g. performance/capacity, as in Rel-8 to Rel-12
  It has been further agreed that
  For $W_1$ CSR, a bitmap of $(N_1 O_1 N_2 O_2)$ bits indicates a two-dimensional-beams subset restriction; this bitmap is referred to as Beam-Subset-Restriction in the rest of this document.
  an additional 8-bit bitmap indicates rank restriction; this bitmap is referred to as Rank-Restriction in the rest of this document.
  and a RRC parameter for CSR on Class A i2 (i.e., $W_2$) will be introduced; this parameter, which takes the form of another bitmap, will be referred to as i2-Subset-Restriction in the rest of this document.

SUMMARY

Although the RRC signaling of the Beam-Subset-Restriction bitmap, the i2-Subset-Restriction bitmap, and/or a Rank-Restriction bitmap are agreed, the exact details on how these bitmaps should be used to achieve codebook subset restriction at the user equipment (UE) for LTE Release 13 are still not specified. A remaining problem is how to utilize the agreed bitmaps to achieve codebook subset restriction for Release 13, to include both two-dimensional beam restriction and rank restriction.

It is an object of embodiments described herein to address this problem. It is possible to achieve this object and others by using methods and apparatuses, such as radio network nodes and wireless devices, as described herein.

According to one aspect, there are provided methods performed by/in a radio network node for configuring a wireless device in a wireless network. An example method comprises identifying, among a predetermined codebook of precoding matrix codewords, a subset of precoding matrix codewords that are not to be reported by the wireless device in channel-state-information (CSI) feedback. The method further comprises transmitting, to the wireless device, a bitmap identifying the subset of precoding matrix codewords that are not to be reported by the wireless device. Each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined by a vector of complex numbers comprised within at least one column of a precoding matrix codeword in the codebook. In some embodiments, the first dimension index $l'_1$ and the second dimension index $l'_2$ may be first and second forbidden dimension indices, respectively, such that the first dimension index $l'_1$ and the second dimension index $l'_2$ identify a forbidden two-dimensional beam for which corresponding precoding matrix codewords are not to be reported.

According to another aspect, there is provided a radio network node for configuring a wireless device in a wireless network, the radio network node comprising processing circuitry and a memory, the memory containing instructions executable by the processing circuitry, whereby the radio network node is adapted and/or configured and/or operative to identify, among a predetermined codebook of precoding matrix codewords, a subset of precoding matrix codewords that are not to be reported by the wireless device in channel-state-information (CSI) feedback, and to transmit, to the wireless device, a bitmap identifying the subset of precoding matrix codewords that are not to be reported by the wireless device. Again, each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined by a vector of complex numbers comprised within at least one column of a precoding matrix codeword in the codebook. Again, in some embodiments, the first dimension index $l'_1$ and the second dimension index $l'_2$ may be first and second forbidden dimension indices, respectively, such that the first dimension index $l'_1$ and the second dimension index $l'_2$ identify a forbidden two-dimensional beam for which corresponding precoding matrix codewords are not to be reported.

According to a third aspect, there are provided methods, by/in a wireless device operating in a wireless network. An example method comprises receiving, from a radio network node, a bitmap indicating, among a predetermined codebook of precoding matrix codewords, a subset of precoding matrix codewords that are not to be reported by the wireless device in channel-state-information (CSI) feedback. The method further comprises identifying, using the bitmap, the subset of precoding matrix codewords that are not to be reported by the wireless device in CSI feedback. Each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined by a vector of complex numbers comprised within at least one column of a precoding matrix codeword in the codebook. Once more, in some embodiments, the first dimension index $l'_1$ and the second dimension index $l'_2$ may be first and second forbidden dimension indices, respectively, such that the first dimension index $l'_1$ and the second dimension index $l'_2$ identify a forbidden two-dimensional beam for which corresponding precoding matrix codewords are not to be reported.

According to a fourth aspect, there is provided a wireless device, comprising processing circuitry and a memory, the memory containing instructions executable by the processing circuitry, whereby the wireless device is adapted and/or configured and/or operative to receive, from a radio network node, a bitmap indicating, among a predetermined codebook of precoding matrix codewords, a subset of precoding matrix codewords that are not to be reported by the wireless device in channel-state-information (CSI) feedback; and to identify, using the bitmap, the subset of precoding matrix codewords that are not to be reported by the wireless device in CSI feedback. Once more, each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined by a vector of complex numbers comprised within at least one column of a precoding matrix codeword in the codebook. As above, in some embodiments, the first dimension index $l'_1$ and the second dimension index $l'_2$ may be first and second forbidden dimension indices, respectively, such that the first dimension index $l'_1$ and the second dimension index $l'_2$ identify a forbidden two-dimensional beam for which corresponding precoding matrix codewords are not to be reported.

The above wireless device and radio network node and methods therein may be implemented and configured according to different optional embodiments to accomplish further features and benefits, to be described below.

Some of the advantages achieved by the techniques described herein are:
- The disclosed techniques provide detailed solutions for how to apply beam restriction across ranks using the agreed Beam-Subset-Restriction bitmap.
- The disclosed techniques provide detailed solutions for mapping between the bits in Beam-Subset-Restriction bitmap and the two-dimensional beams.
- The disclosed techniques resolve any ambiguity regarding the order in or priority with which different restriction signals should be applied when multiple bitmaps, i.e., Beam-Subset-Restriction bitmap, i2-Subset-Restriction bitmap, and/or Rank-Restriction bitmap, are RRC signaled to the UE.

BRIEF DESCRIPTION OF FIGURES

The presently disclosed methods and apparatus will now be described in more detail by means of exemplary embodiments and with reference to the accompanying figures, in which:

FIG. 15 illustrates a Rank-1 Class Codebook.

FIG. 16 illustrates selection of $i'_2$ and $(s_1, s_2)$ for Rank-1 Class A Codebook.

FIG. 17 illustrates a Rank-2 Class A Codebook.

FIG. 18 illustrates selection of $i'_2$ and $(s_1, s_2)$ for Rank-2 Class A Codebook.

FIG. 19 illustrates a Rank-3 Class A Codebook.

FIG. 20 illustrates a Rank-4 Class A Codebook.

FIG. 21 illustrates Equations 11 and 12 as described herein.

FIG. 22 illustrates Equations 13 and 14 as described herein.

DETAILED DESCRIPTION

Figure 1:
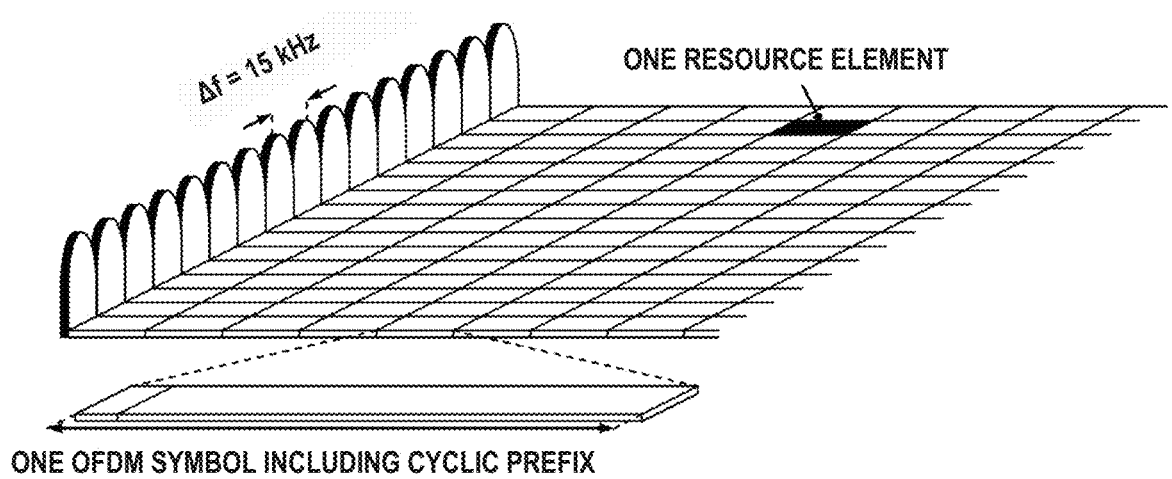
FIG. 1 illustrates an example of an LTE downlink physical resource.
Figure 2:
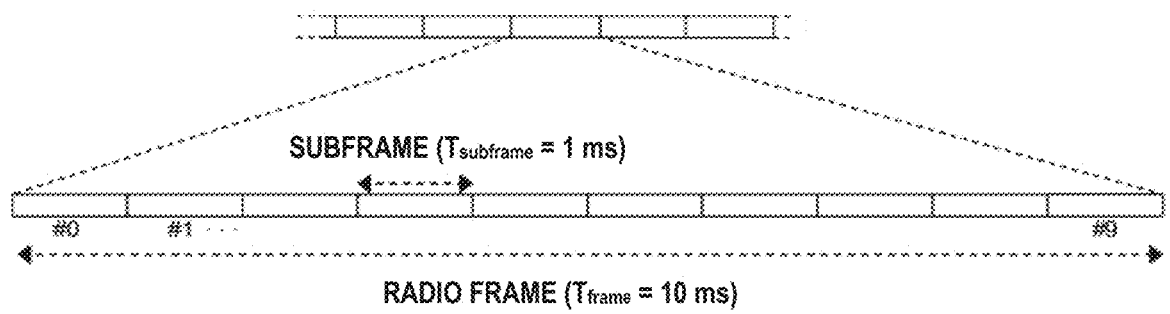
FIG. 2 illustrates an example of an LTE time-domain (frame) structure.
Figure 3:
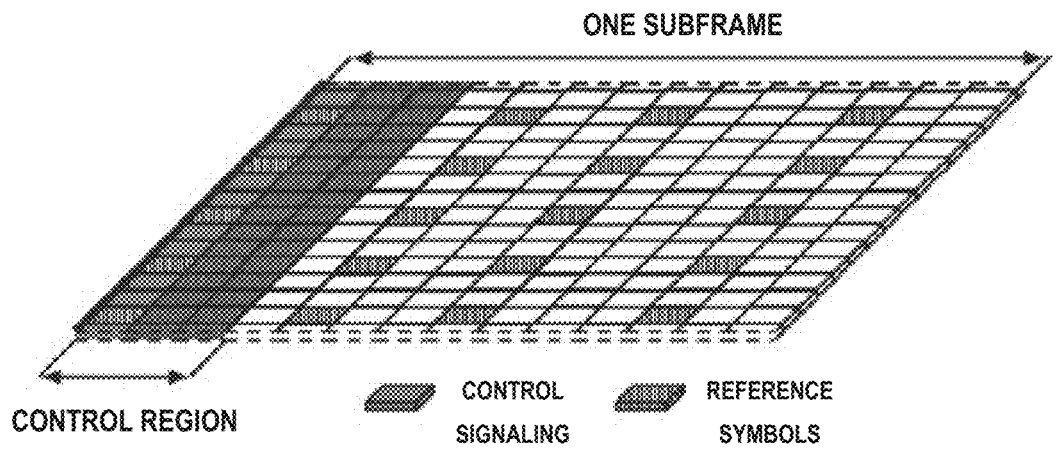
FIG. 3 illustrates an LTE downlink subframe with three OFDM symbols for lower layer control signaling, in particular DCI messages
Figure 4:
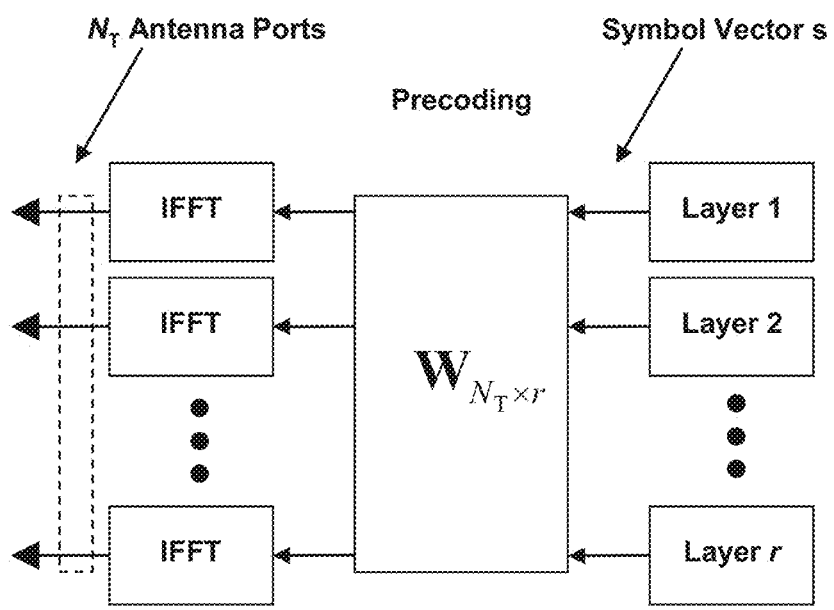
FIG. 4 illustrates the transmission structure of precoded spatial-multiplexing mode in LTE.
Figure 5:
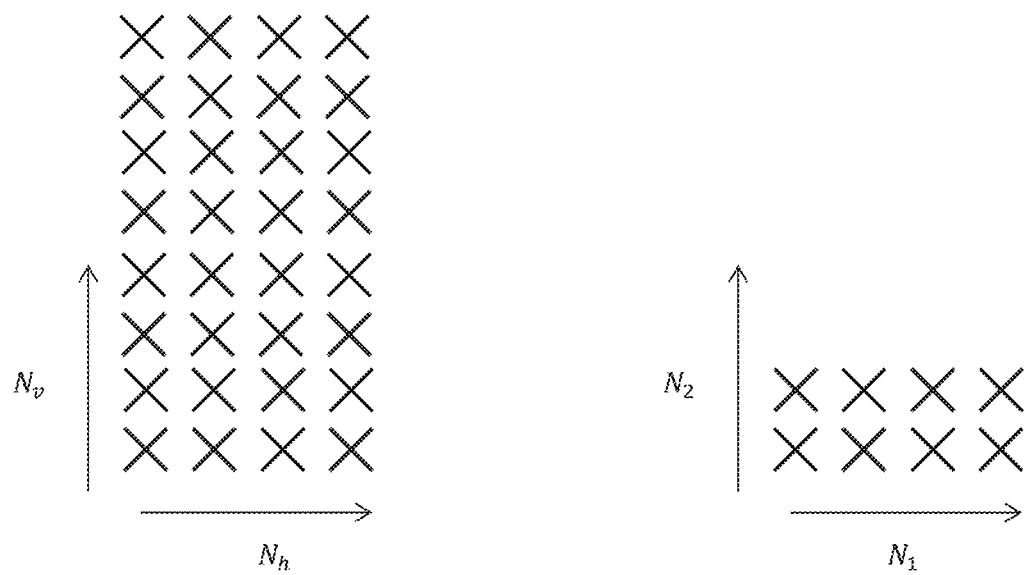
FIG. 5 illustrates an example antenna array and an array of corresponding antenna ports.

The following description with reference to the accompanying drawings is provided to assist in a comprehensive understanding of exemplary embodiments of the invention as defined by the enumerated example embodiments provided below, and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. Also, descriptions of well-known functions and constructions are omitted for clarity and conciseness. Accordingly, it should be apparent to those skilled in the art that the following description of exemplary embodiments of the present invention are provided for illustration purpose only and not for the purpose of limiting the invention as defined by the appended enumerated example embodiments and their equivalents. It is to be understood that the singular forms "a," "an," and "the" include plural referents unless the context clearly dictates otherwise. Thus, for example, reference to "a component surface" includes reference to one or more of such surfaces.

As used herein, the non-limiting terms "wireless device" and "User Equipment," or UE," may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, Universal Serial Bus (USB) dongle, a portable electronic radio communication device, a sensor device equipped with radio communication capabilities or the like. In particular, the term "wireless device" should be interpreted as a non-limiting term comprising any type of wireless device communicating with a radio network node in a cellular or mobile communication system or any device equipped with radio circuitry for wireless communication according to any relevant standard for communication within a cellular or mobile communication system.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, for LTE.

In the present disclosure, the non-limiting term "wireless network" may refer to any radio communication networks, in particular Universal Terrestrial Radio Access (UTRA) for Wideband Code Division Multiple Access (WCDMA) or Evolved Universal Terrestrial Radio Access (E-UTRA) for LTE, but any other wireless communications system such as WiFi and WiMax can be anticipated. Although terminology from 3GPP LTE is used in this disclosure to exemplify the inventive techniques and apparatus, this should not be seen as limiting the scope of the disclosed techniques and apparatus to only the aforementioned system. Other wireless systems, including WCDMA, WiFi, WiMax, LTE for unlicensed band, Ultra Mobile Broadband (UMB (and GSM, may also benefit from exploiting the ideas covered within this disclosure.

Also note that terminology such as eNodeB and UE should be considering non-limiting and does in particular not imply a certain hierarchical relation between the two; in general "eNodeB" or Transmission Point (TP) could be considered as device 1 and "UE" device 2, and these two devices communicate with each other over some radio channel. Herein, we focus on MIMO wireless transmissions in the downlink, but the techniques can be applied in the uplink, in some embodiments.

As discussed above, codebook subset restriction is currently supported in LTE (Releases 12 and before). With codebook subset restriction, a subset of the precoders in the codebook is restricted so that the UE has a smaller set of possible precoders to choose from. However, for two-dimensional antenna arrays, the codebook size increases significantly since the precoders in the codebook need to span two dimensions, typically the horizontal and vertical domain. Signaling a codebook subset restriction (CSR) in LTE prior to Release 13 is by means of a bitmap with one bit for every precoder in the codebook. Using the same approach for a two-dimensional codebook can thus impose a large overhead. To address the shortcomings of the legacy releases in the context of FD-MIMO, it is agreed that LTE Release 13 will support RRC signaling of Beam-Subset-Restriction bitmap, an i2-Subset-Restriction bitmap and/or a Rank-Restriction bitmap.

Although the RRC signaling of these bitmaps are agreed, the exact details on how these bitmaps should be used to achieve codebook subset restriction for LTE Release 13 are still not specified. A problem that the present disclosure addresses is how to utilize the agreed bitmaps to achieve codebook subset restriction for Release 13, so as to include both two-dimensional beam restriction and rank restriction.

This disclosure provides detailed solutions on how to utilize the agreed bitmaps to achieve codebook subset restriction for Release 13, including both two-dimensional beam restriction and rank restriction. The techniques disclosed herein comprise the following main components:

- Two different mapping schemes between the bits in Beam-Subset-Restriction bitmap and the two-dimensional beams are provided: (1) a second-dimension-first mapping, e.g., a vertical-dimension-first mapping, and (2) a first-dimension-first mapping, e.g., a horizontal-first-mapping.
- Details of how beam restriction across ranks is performed are presented. In a preferred embodiment, for any rank, a codeword is not allowed to be reported if the codeword transmits at least one layer of data on any two-dimensional beam that is not allowed to be reported (as signaled by the Beam-Subset-Restriction bitmap).
- Priority rules are given on the order of applying different restriction signals when multiple bitmaps (i.e., Beam-Subset-Restriction bitmap, i2-Subset-Restriction bitmap, and/or Rank-Restriction bitmap) are RRC signaled to the UE.

Figure 6:
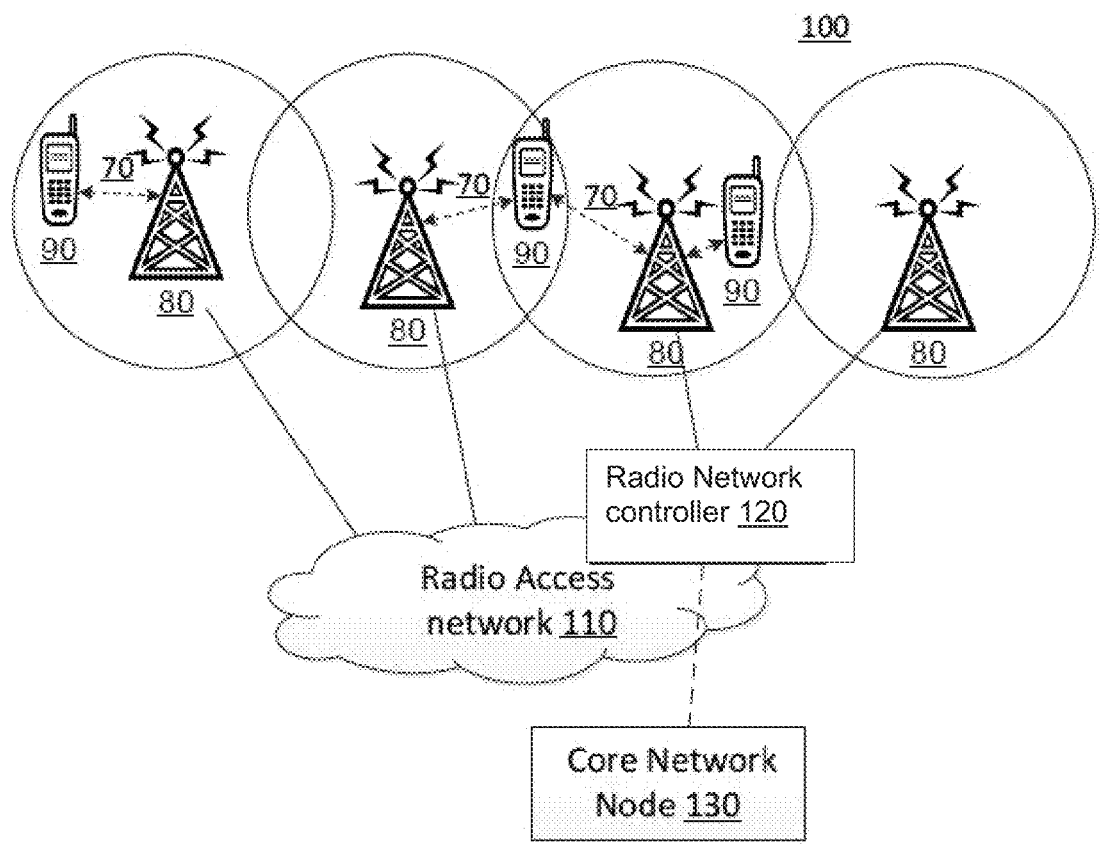
FIG. 6 illustrates an exemplary wireless network 100 in which embodiments herein may be applied and/or implemented.

FIG. 6 illustrates a wireless network 100 in which embodiments, disclosed herein, may be carried out. The wireless network 100 includes one or more wireless devices 90, radio network nodes 80, and network nodes, which may include a radio network controller 120, for example.

The wireless network may be connected to core network nodes 130. A wireless device 90 may communicate with a radio network node 80 over a wireless interface. For example, wireless devices 90 may transmit wireless signals to radio network nodes 80 and/or receive wireless signals from radio network nodes 80. The wireless signals may contain voice traffic, data traffic, control signals, and/or any other suitable information. The wireless signals may be transmitted over a radio link 70.

Radio network nodes 80 may interface with network nodes, such as e.g. a radio network controller 120 in a radio access network 110. A radio network controller 120 may control radio network nodes 80 and may provide certain radio resource management functions, mobility management functions, and/or other suitable functions. Radio network controller 120 may interface with core network node 130. In certain scenarios, radio network controller 120 may interface with core network node 130 via an interconnecting network. Radio network nodes 80 may also interface with core network node 130. In certain scenarios, radio network node 80 may interface with core network node 130 via an interconnecting network.

In some scenarios, core network node 130 may manage the establishment of communication sessions and various other functionalities for wireless devices 90. Wireless devices 90 may exchange certain signals with core network node 130 using the non-access stratum (NAS) layer. In non-access stratum signaling, signals between wireless device 90 and core network node 130 may be transparently passed through the radio access network. As described with respect to FIG. 6 above, embodiments of network 100 may include one or more wireless devices 90, and one or more different types of network nodes capable of communicating (directly or indirectly) with wireless devices 90. Examples of the network nodes include radio network nodes 80. The network may also include any additional elements suitable to support communication between wireless devices 90 or between a wireless device 90 and another communication device (such as a landline telephone).

Wireless devices 90 and radio network nodes 80 may use any suitable radio access technology, such as long term evolution (LTE), LTE-Advanced, UMTS, High Speed Packet data Access (HSPA), Global System for Mobile Communication (GSM), cdma2000, WiMax, WiFi, another suitable radio access technology, or any suitable combination of one or more radio access technologies. For purposes of example, various embodiments may be described within the context of certain radio access technologies, such as LTE. However, the scope of the disclosure is not limited to the examples and other embodiments could use different radio access technologies. Each of wireless devices 90, radio network nodes 80, radio network controller 120, and core network node 130 may include any suitable combination of hardware and/or software. Examples of particular embodiments of wireless devices 90 and radio network nodes 80 are described in detail below.

A first aspect of the inventive techniques relates to mapping between Beam-Subset-Restriction bits and two-dimensional beams. Let the bitmap for the Beam-Subset-Restriction parameter be formed by the bit sequence $a_{S-1}, a_{S-2}, \ldots a_3, a_2, a_1, a_0$, where $a_0$ is the Least Significant Bit (LSB), $a_{S-1}$ is the Most Significant Bit (MSB), and $S=N_1O_1N_2O_2$. In some embodiments, a bit value of "1" indicates that a particular two-dimensional) beam is not allowed to be reported in any rank. In other embodiments, a bit value of "0" indicates that a particular two-dimensional beam is not allowed to be reported in any rank.

Let $l_1$ and $l_2$ identify a two-dimensional beam that may or may not be restricted, or "forbidden," where $l_1$ and $l_2$ are as defined above. Furthermore, let $(l'_1, l'_2)$ identify a forbidden two-dimensional beam, i.e., a two-dimensional beam that is not allowed to be reported in any rank, corresponding to a DFT vector with index $l'_1$ in the first dimension and a DFT vector with index $l'_2$ in the second dimension. The indices $l'_1$ and $l'_2$ can be referred to as forbidden dimension indices. If a bit in the Beam-Subset-Restriction bitmap indicates a forbidden two-dimensional beam, then this bit corresponds to only one combination of a forbidden dimension index $l'_1$ in the first dimension and a forbidden dimension index $l'_2$ in the second dimension out of the $O_1N_1O_2N_2$ possible combinations of the first dimension index $l_1$ and the second dimension index $l_2$.

Note that this technique could be adapted such that the bitmap specifically identifies two-dimensional beams that should be reported, rather than specifically identifying "forbidden" two-dimensional beams. It will be appreciated that, given a finite set of possible two-dimensional beams, specifically identifying allowed two-dimensional beams is equivalent to (implicitly) identifying forbidden two-dimensional beams. Thus, it will be appreciated that the first and second dimension indices $l'_1$ and $l'_2$ might, in some embodiments, identify allowed two-dimensional beams, rather than forbidden beams, in which case these dimension indices $l'_1$ and $l'_2$ are referred to as simply dimension indices, rather than "forbidden" dimension indices.

Figure 7:
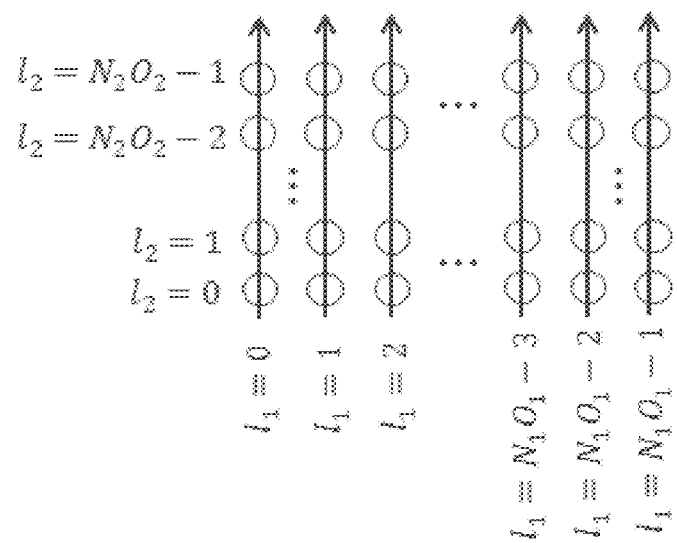
FIG. 7 illustrates a "second-dimension-first" approach to mapping between the Beam-Subset-Restriction bits and two-dimensional beams.
Figure 8:
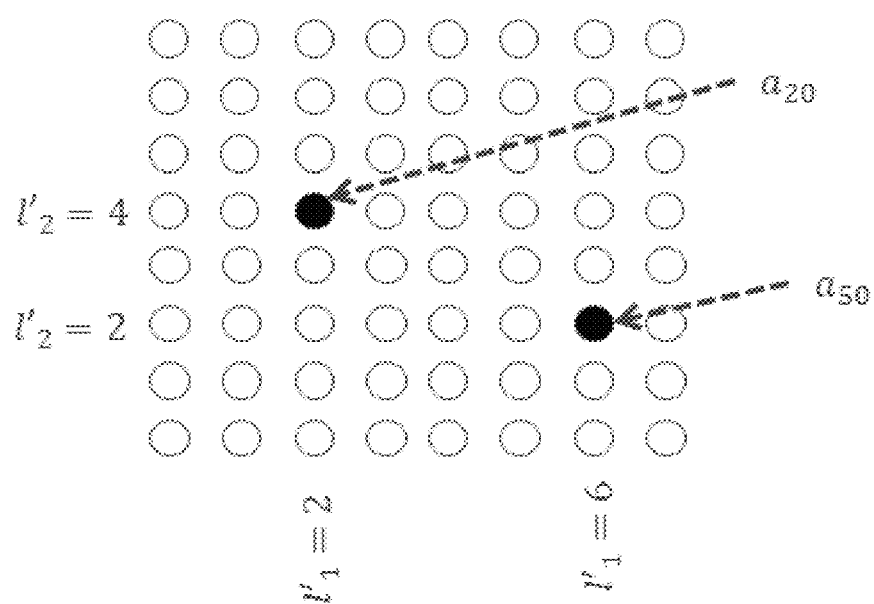
FIG. 8 illustrates an example of "second-dimension-first" mapping.

The mapping between the bits in Beam-Subset-Restriction bitmap and the two-dimensional beams can be done in two different ways. In some embodiments, the index n of a bit $a_n$ in the bitmap varies most slowly with the second dimension (e.g., vertical) beam index, and so is labeled a 'second-dimension-first' mapping, as shown in FIG. 7. In the second-dimension-first mapping scheme, the bit $a_n$ can forbid the two-dimensional beam with forbidden dimension indices $$l'_1 = \left\lfloor \frac{n}{N_2 O_2} \right\rfloor l'_2 \text{ and } l'_2 = n - N_2 O_2 \left\lfloor \frac{n}{N_2 O_2} \right\rfloor,$$

where [ ] denotes a floor function. Equivalently, n can be calculated from $l'_1$ and $l'_2$ with $n = l'_2 + N_2 O_2 l'_1$. An example of the second-dimension-first mapping scheme with $(N_1, N_2) = (2,2)$ and $(O_1, O_2) = (4,4)$ is illustrated in FIG. 8.

Figure 9:
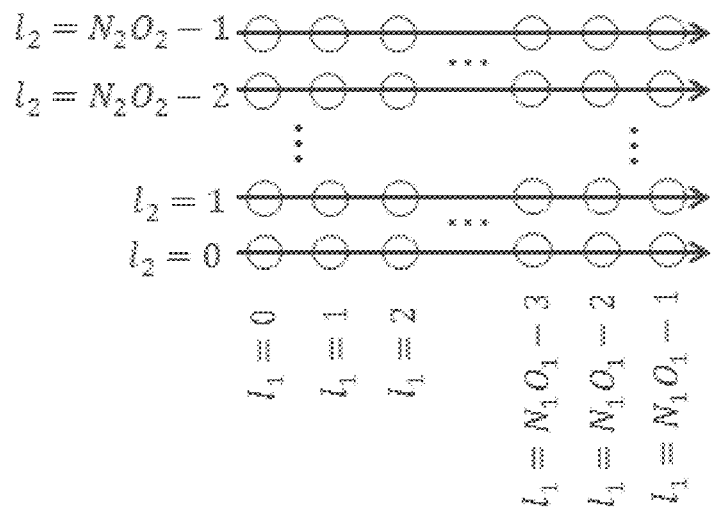
FIG. 9 illustrates a "first-dimension-first" approach to mapping between the Beam-Subset-Restriction bits and two-dimensional beams.

In an alternate approach, the index n of a bit $a_n$ in the bitmap varies most slowly with the first dimension (e.g., horizontal) beam index, and so is labeled a 'first-dimension-first' mapping, as shown in FIG. 9. In the first-dimension-first mapping scheme, the bit a, can forbid the two-dimensional beam with forbidden dimension indices $$l'_1 = n - N_1 O_1 \left\lfloor \frac{n}{N_1 O_1} \right\rfloor \text{ and } l'_2 = \left\lfloor \frac{n}{N_1 O_1} \right\rfloor.$$

Figure 10:
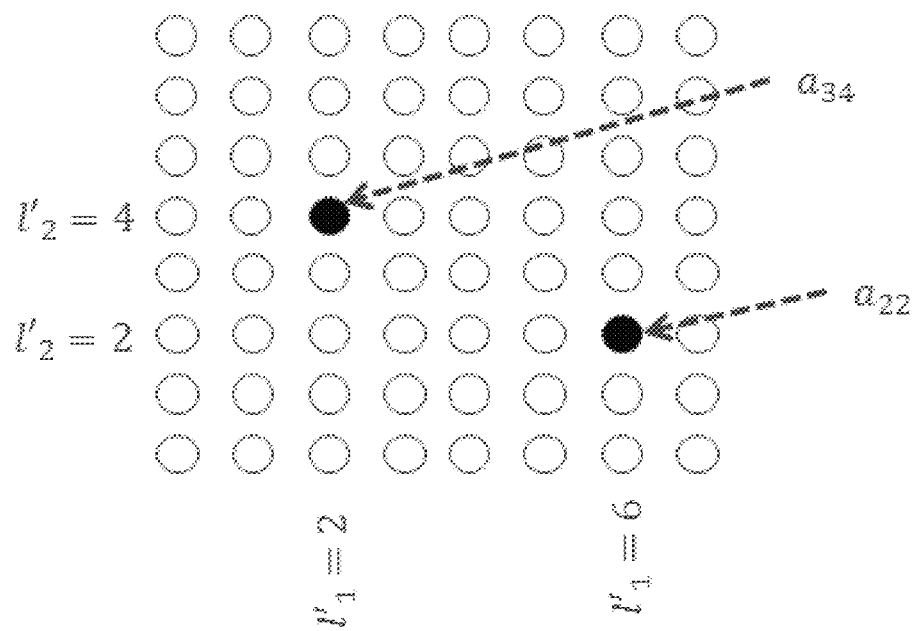
FIG. 10 illustrates an example of "first-dimension-first" mapping.

Equivalently, n can be calculated from $l'_1$ and $l'_2$ with $n = l'_1 + N_1 O_1 l'_2$. An example of the first-dimension-first mapping scheme with $(N_1, N_2) = (2,2)$ and $(O_1, O_2) = (4,4)$ is illustrated in FIG. 10.

Another aspect of the presently disclosed techniques relates to the Rank-Restriction parameter. Let the bitmap for the Rank-Restriction parameter be formed by the bit sequence $\tilde{a}_7, \tilde{a}_6, \ldots \tilde{a}_3, \tilde{a}_2, \tilde{a}_1, \tilde{a}_0$ where $\tilde{a}_0$ is the LSB and $\tilde{a}_7$ is the MSB. The $i^{th}$ bit $\tilde{a}_i$ corresponds to the $(i+1)^{th}$ rank. In some embodiments, a bit value of "1" for $\tilde{a}_i$ indicates that codewords corresponding to the $(i+1)^{th}$ rank are not allowed to be reported. In other embodiments, a bit value of "0" for di indicates that codewords corresponding to the $(i+1)^{th}$ rank are not allowed to be reported.

In several embodiments of the presently disclosed techniques and apparatus, the forbidding of a two-dimensional beam depends on the rank and the value of the Config parameter. Considering the rank 1 Class A codebook of the table shown in FIG. 15, a given rank-1 codeword $W_{m_1, m_2, n}^{(4)}$ as defined in Eq. 4 is forbidden, i.e., not allowed to be reported, if $m_1 = l'_1$ and $m_2 = l'_2$, where $(m_1, m_2)$ are determined by the value of Config (see the table shown in FIG. 16) and $(l'_1, l'_2)$ represent the forbidden dimension indices of any two-dimensional beam that is not allowed to be reported, as signaled by the Beam-Subset-Restriction bitmap.

For the Class A codebooks of ranks 2, 3, and 4 defined above, respectively, a given codeword (which, depending on the rank, can be defined by Eq. 7, Eq. 8, Eq. 9, or Eq. 10) is forbidden, i.e., not allowed to be reported, if either or both of the following two conditions are met Condition 1: $m_1 = l'_1$ and $m_2 = l'_2$, simultaneously
Condition 2: $m'_1 = l'_1$ and $m'_2 = l'_2$, simultaneously where $(m_1, m_2)$ and $(m'_1, m'_2)$ are determined by the value of Config, see the table shown in FIG. 18, the table shown in FIG. 19, and the table shown in FIG. 20. Furthermore, $(l'_1, l'_2)$ represents any two-dimensional beam that is not allowed to be reported, as signaled by the Beam-Subset-Restriction bitmap.

For the rank 5-8 Class A codebooks described above, a given rank 5-8 codeword is forbidden, i.e., not allowed to be reported, if the codeword contains at least one forbidden two-dimensional beam, as defined jointly by $l'_1$ and $l'_2$. This happens if at least one of the conditions given in Table 7 is met. In Table 7, the $\delta_{i,j}$ values are those from the rank 5-8 codebooks described above, while $i_{1,1}$ and $i_{1,2}$ are the PMI indices corresponding to the first and second dimensions, as described above. The conditions in each column of the table are checked a column at a time according to the rank (denoted by r). Conditions 1-3 apply to codewords with ranks 5, 6, 7, or 8, while Condition 4 only applies to codewords with ranks 7 or 8. For at least one applicable column (i.e., condition), if forbidden dimension index $l'_1$ is equal to the cell on the first row of the column, and if forbidden dimension index $l'_2$ is simultaneously equal to the cell on the second row of the column, then codeword $W_{i_{1,1}, i_{1,2}}^{(r)}$ is forbidden, i.e., not allowed to be reported.

TABLE 7

Rank 5-8 Codeword Restriction

| | Condition 1 | Condition 2 | Condition 3 | Condition 4 |
|---|---|---|---|---|
| Rank | 5, 6, 7, 8 | 5, 6, 7, 8 | 5, 6, 7, 8 | 7, 8 |
| $l'_1$ | $s_1 i_{1,1}$ | $s_1 i_{1,1} + \delta_{1,1}$ | $s_1 i_{1,1} + \delta_{1,2}$ | $s_1 i_{1,1} + \delta_{1,3}$ |
| $l'_2$ | $s_2 i_{1,2}$ | $s_2 i_{1,2} + \delta_{2,1}$ | $s_2 i_{1,2} + \delta_{2,2}$ | $s_2 i_{1,2} + \delta_{2,3}$ |

Embodiments based on Table 7 allow for flexibility, since offset values $\delta_{i,j}$ are used in the table. Therefore, new codebook configurations can be specified with different values of $\delta_{i,j}$, and this codeword restriction table can be used without change. However, this approach is somewhat indirect, since $\delta_{i,j}$ is used as an intermediate variable. A more direct approach that avoids the need for $\delta_{i,j}$ is shown in Table 8 below.

As in Table 7, conditions in Table 8 are grouped according to RI, and there are 3 sets of conditions for ranks 5, 6, 7, and 8, while there is one condition that applies to only ranks 7 and 8. These conditions are identified in Table 9. Each condition column is split into two minor columns corresponding to the conditions for $l'_1$ and $l'_2$. For a given row within a major column, if forbidden dimension index $l'_1$ is equal to the cell on the left minor column, and if forbidden dimension index $l'_2$ is equal to the cell on the right minor column, the codeword $W_{i_{1,1}, i_{1,2}}^{(r)}$ is forbidden, i.e., not allowed to be reported. Each row of Table 8 corresponds to a codebook configuration of ranks 5-8 and a relationship of the number of ports in the first and second dimension, $N_1$ and $N_2$. The codebook configuration and antenna port number relationships are shown in the corresponding columns on the left-hand side of the table.

TABLE 8

Alternative Rank 5-8 Codeword Restriction

| Codebook Configuration | Antenna Port Configuration | Condition 1 5, 6, 7, 8 | | Condition 2 5, 6, 7, 8 | | Condition 3 5, 6, 7, 8 | | Condition 4 7, 8 | |
|---|---|---|---|---|---|---|---|---|---|
| | | $l'_1$ | $l'_2$ | $l'_1$ | $l'_2$ | $l'_1$ | $l'_2$ | $l'_1$ | $l'_2$ |
| 2 | $N_1 \geq N_2$ or $N_1 < N_2$ | $s_1 i_{1,1}$ | $s_2 i_{1,2}$ | $s_1 i_{1,1} + O_1$ | $s_2 i_{1,2}$ | $s_1 i_{1,1} + O_1$ | $s_2 i_{1,2} + O_2$ | $s_1 i_{1,1}$ | $s_2 i_{1,2} + O_2$ |

TABLE 8-continued

Alternative Rank 5-8 Codeword Restriction

| Codebook Configuration | Antenna Port Configuration | Condition 1 5, 6, 7, 8 | | Condition 2 5, 6, 7, 8 | | Condition 3 5, 6, 7, 8 | | Condition 4 7, 8 | |
|---|---|---|---|---|---|---|---|---|---|
| | | $l'_1$ | $l'_2$ | $l'_1$ | $l'_2$ | $l'_1$ | $l'_2$ | $l'_1$ | $l'_2$ |
| 3 | $N_1 \geq N_2$ | $s_1 i_{1,1}$ | $s_2 i_{1,2}$ | $s_1 i_{1,1} + O_1$ | $s_2 i_{1,2}$ | $s_1 i_{1,1} + 2O_1$ | $s_2 i_{1,2} + O_2$ | $s_1 i_{1,1} + 3O_1$ | $s_2 i_{1,2} + O_2$ |
| | $N_1 < N_2$ | $s_1 i_{1,1}$ | $s_2 i_{1,2}$ | $s_1 i_{1,1}$ | $s_2 i_{1,2} + O_2$ | $s_1 i_{1,1} + O_1$ | $s_2 i_{1,2} + 2O_2$ | $s_1 i_{1,1} + O_1$ | $s_2 i_{1,2} + 3O_2$ |
| 4 | $N_1 \geq N_2$ | $s_1 i_{1,1}$ | $s_2 i_{1,2}$ | $s_1 i_{1,1} + O_1$ | $s_2 i_{1,2}$ | $s_1 i_{1,1} + 2O_1$ | $s_2 i_{1,2}$ | $s_1 i_{1,1} + 3O_1$ | $s_2 i_{1,2}$ |
| | $N_1 < N_2$ | $s_1 i_{1,1}$ | $s_2 i_{1,2}$ | $s_1 i_{1,1}$ | $s_2 i_{1,2} + O_2$ | $s_1 i_{1,1}$ | $s_2 i_{1,2} + 2O_2$ | $s_1 i_{1,1}$ | $s_2 i_{1,2} + 3O_2$ |

As an alternative or complementary method to identify whether a codeword is forbidden, a two-dimensional beam can be identified as a vector of complex numbers. First we define a forbidden two-dimensional beam vector as: $x = v_{l'_1} \otimes u_{l'_2}$, where forbidden dimension indices $l'_1$ and $l'_2$ are determined, as described above, from the index n of bit a, of the Beam-Subset-Restriction parameter. As described in the background section above, the top $N_1 N_2$ rows of each column i of a given precoding matrix codeword $W^{(r)}$ for r layers can be expressed as a two-dimensional beamforming vector with the form $W^{(r)}(1:N_1 N_2, i) = v_{m_1} \otimes u_{m_2}$, where i spans all columns of $W^{(r)}$. Then, if each element of the top $N_1 N_2$ rows of the precoding matrix codeword is the same as the forbidden beam vector x, that two-dimensional beam in that column of the precoding matrix codeword is the same as the forbidden two-dimensional beam. This condition may be expressed for column i as:

$$W^{(r)}(k,i) = x(k) \forall k \in \{0, 1, \ldots, N_1 N_2\}$$

A precoding matrix codeword from the precoding codebook is not allowed to be reported if the precoding matrix codeword contains at least one column i that is the same as one of the forbidden two-dimensional beams. The check for identifying whether a codeword $W^{(r)}$ is forbidden, i.e., not allowed to be reported, is performed over all forbidden two-dimensional beams indicated by forbidden dimension indices $(l'_1, l'_2)$ and all columns (i.e., $\forall i$) of codeword $W^{(r)}$.

In a similar method to identify whether a codeword is forbidden, the forbidden beamforming vector is expressed as a codeword for Config 1 of a rank-1 FD-MIMO codebook. The Config 1 rank-1 codebook contains all two-dimensional beams in the FD-MIMO codebooks for all ranks as its codewords. Therefore, the two-dimensional beams to be forbidden for any rank can be identified as codewords in the Config 1 rank-1 codebook. If the bit $a_n$ of the Beam-Subset-Restriction parameter indicates that beam n is forbidden, forbidden dimension indices $l'_1$ and $l'_2$ are determined as described above. The corresponding codeword of the Config 1 rank-1 codebook is then used to determine if column i of a given rank-r precoding matrix codeword $W^{(r)}$ is forbidden using the following condition:

$$W^{(r)}(k,i) = W_{l'_1, l'_2, 0}^{(1)}(k) \forall k \in \{0, 1, \ldots, N_1 N_2\}$$

Note that $W_{l'_1, l'_2, 0}^{(1)}$ is a column vector.

Similarly, for any rank, a codeword from the precoding codebook is not allowed to be reported if the codeword transmits at least one layer of data on a two-dimensional beam that is not allowed to be reported, as signaled by the Beam-Subset-Restriction bitmap.

In some alternative embodiments, if a codeword in the codebook for a given rank, for example as defined in the background section above, contains at least one two-dimensional beam that is not allowed to be reported, as signaled by the Beam-Subset-Restriction bitmap, all the codewords from the codebook that contains that two-dimensional beam are not allowed to be reported.

In still other alternative embodiments, which applies when either or both $L'_1 > 1$ and $L'_2 > 1$ are satisfied, if at least one two-dimensional beam is not allowed to be reported, as signaled by the Beam-Subset-Restriction bitmap, then all beam groups in any rank, containing this two-dimensional beam are not allowed to be reported.

Another aspect of the presently disclosed techniques and apparatus relates to codebook subset restriction (CSR) priority rules. When a UE signaled with more than one of the following codebook subset restriction bitmaps, different codewords may be forbidden by the different bitmaps. Some rules are needed to specify which restriction bitmap has the higher priority in case of conflicts, e.g., a codeword is allowed in one restriction bitmap but not allowed in another restriction bitmap(s).

The Beam-Subset-Restriction
The i2-Subset-Restriction
The Rank-Restriction

In some embodiments, a codeword of a particular rank is not allowed in CSI report if it is forbidden by any one of the multiple restriction bitmaps.

If a UE is RRC configured with the Beam-Subset-Restriction bitmap and the Rank-Restriction bitmap, but not with the i2-Subset-Restriction bitmap, the Rank-Restriction bitmap has priority over the Beam-Subset-Restriction bitmap. The forbidden rank(s), i.e., one or more rank(s) that are not allowed to be reported by the UE, are determined through the Rank-Restriction bitmap. The UE applies beam subset restriction, as described above, only on codewords associated with ranks that are not forbidden, (i.e., on codewords associated with ranks that are allowed to be reported by the UE.

In other embodiments, if a UE is RRC configured with the Beam-Subset-Restriction bitmap and the i2-Subset-Restriction bitmap, but not with the Rank-Restriction bitmap, then the UE first applies beam subset restriction, as described above, with higher priority, on codewords associated with all ranks. Then, additional codeword restriction is applied through i2-Subset-Restriction, where the i2-Subset-Restriction bitmap may be used to indicate restrictions of certain ranks. In some embodiments according to this approach, a codeword for a particular rank is not allowed to be reported by the UE when the i2-Subset-Restriction bitmap bits associated with that rank contains all zeros. Alternatively, a rank may not be allowed to be reported by the UE when the i2-Subset-Restriction bitmap bits associated with the rank contains all ones.

In other embodiments, if a UE is RRC configured with the Beam-Subset-Restriction bitmap and the i2-Subset-Restriction bitmap, but not with the Rank-Restriction bitmap, then the UE first applies the i2-Subset-Restriction, with higher priority, on all codewords per rank, followed by beam subset restriction, as described above, on the remaining codewords associated with each rank.

If the UE is RRC configured with the Beam-Subset-Restriction bitmap, the Rank-Restriction bitmap, and the i2-Subset-Restriction bitmap, then the Rank-Restriction bitmap is applied first by the UE. Then, the UE applies beam subset restriction only on codewords associated with ranks that are not forbidden. Any additional codeword restrictions are finally realized through applying i2-Subset-Restriction.

In view of the detailed discussion above, it will be appreciated that several embodiments of the presently disclosed techniques correspond to one or more of the following example methods:

A. A method of restricting which precoding matrix codewords of a codebook of precoding matrix codewords can be reported in CSI feedback, comprising providing a bitmap wherein
  a bit in the bitmap with index n corresponds to only one combination of a first forbidden dimension index $l'_1$ and a second forbidden dimension index $l'_2$ out of the possible combinations of the first dimension index $l'_1$ and the second dimension index $l'_2$; and
  the first forbidden dimension index $l'_1$ and the second forbidden dimension index $l'_2$ identify a two-dimensional beam, the two-dimensional beam being a vector of complex numbers comprised within at least one column of a precoding matrix codeword in the codebook. Here, referring to a "two-dimensional beam being a vector of complex numbers" is meant to indicate that the physical two-dimensional beam is defined by a vector of complex numbers in the codebook.

B. The method of A, where the bits of the bitmap are indexed with index n, and the index of the bit n in the bitmap is calculated as a linear combination of the first forbidden dimension index and the second forbidden dimension index of the form $n=l'_1+Cl'_2$, where C is a positive integer.

C. The method of A, where the bits of the bitmap are indexed with index n, and the index of the bit n is calculated as a linear combination of the first forbidden dimension index and the second forbidden dimension index of the form $n=l'_2+Cl'_1$, where C is a positive integer.

D. The method of any of A-C, further comprising identifying a precoding matrix codeword as a matrix whose columns are determined using at least one pair of dimension indices, each pair of dimension indices comprising a first dimension index and a second dimension index, and for each pair of dimension indices, if the first dimension index is equal to the first forbidden dimension index $l'_1$ and the second dimension index is equal to the second forbidden dimension index $l'_2$, the precoding matrix codeword is is not allowed to be reported in CSI feedback.

E. The method of A, where for a rank r, any given precoding matrix codeword of the codebook of precoding matrix codewords is not allowed to be reported in CSI feedback if transmissions using the given precoding matrix codeword would have at least one spatially multiplexed layer of data on a two-dimensional beam that is not allowed to be reported.

F. The method of A, where for a rank r, any given precoding matrix codeword of the codebook of precoding matrix codewords is not allowed to be reported in CSI feedback if at least one column of the given precoding matrix codeword has a set of rows that are all equal to the corresponding elements of any one of the two-dimensional beams that are not allowed to be reported.

G. A method where the precoding matrix codewords in an entire extended codebook table are not allowed to be reported if the extended codebook contains at least one two-dimensional beam that is not allowed to be reported.

H. A method of applying codebook subset restriction when receiving multiple configurations, parameters or bitmaps related to codebook subset restriction, wherein a precoding matrix codeword is forbidden if the precoding matrix codeword is forbidden as a result of at least one of the configurations, parameters or bitmaps.

Embodiments and variations of the above-summarized methods are detailed below. It will be appreciated that these methods may be carried out by a radio network node 80 and/or by a wireless device 90, as appropriate.

Figure 11:
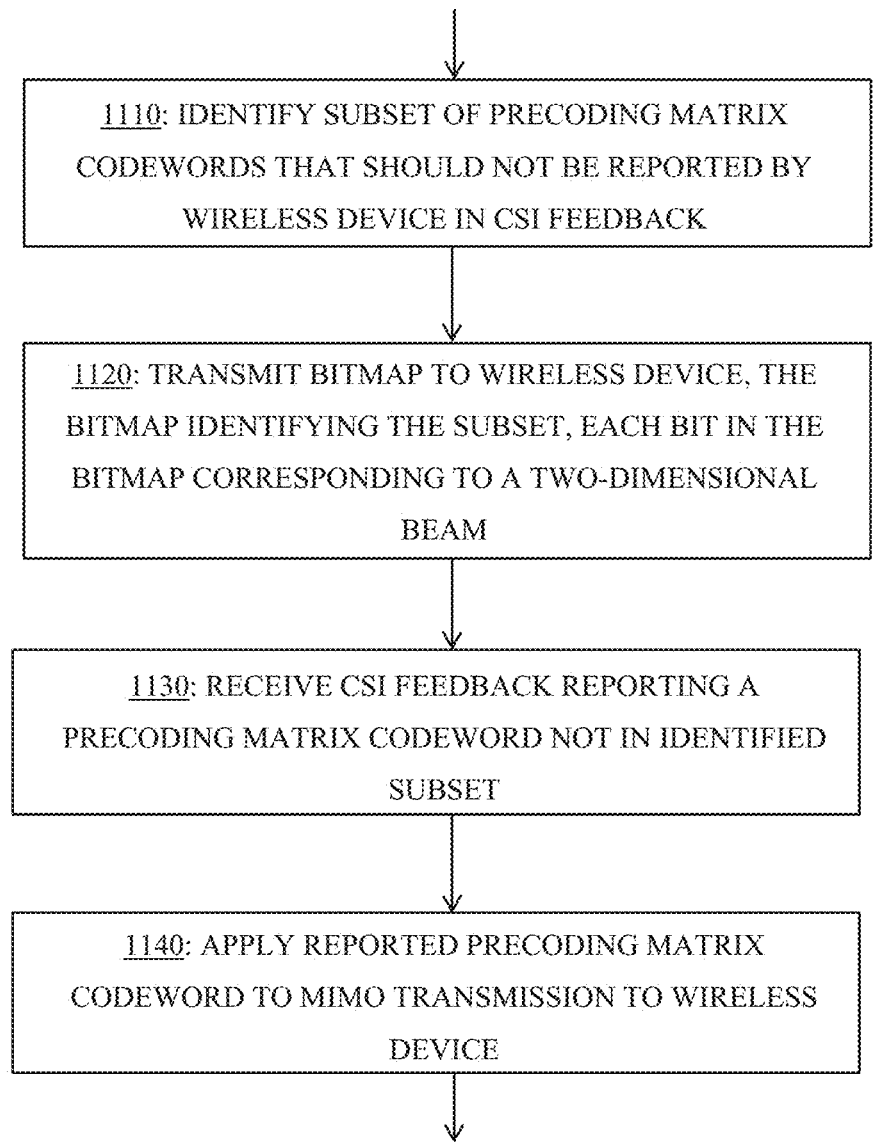
FIG. 11 illustrates a method performed in a radio network node 80 according to embodiments herein.

In the following and according to embodiments herein, then, there are provided methods performed by/in a radio network node 80 of a wireless network 100, for configuring a wireless device in a wireless network. An example method is shown in FIG. 11 and comprises, as shown at block 1110, identifying, among a predetermined codebook of precoding matrix codewords, a subset of precoding matrix codewords that are not to be reported by the wireless device 90 in channel-state-information (CSI) feedback, i.e., that the wireless device 90 should not report. Note that when referring to the reporting of codewords, the present disclosure may indicate that the reporting of a codeword is forbidden, is not allowed to be reported, should not be reported, or is not to be reported. These are all intended to mean the same thing, in the context of the present disclosure.

The method of FIG. 11 further comprises, as shown at block 1120, transmitting, to the wireless device 90, a bitmap identifying the subset of precoding matrix codewords that are not to be reported by the wireless device 90. Each bit in the bitmap corresponds to only one combination of a first dimension index $l'_1$ and a second dimension index $l'_2$ out of the possible combinations of the first dimension index $l'_1$ and the second dimension index $l'_2$, where the forbidden dimension index $l'_1$ and the second dimension index $l'_2$ identify a two-dimensional beam, the two-dimensional beam being defined by a vector of complex numbers comprised within at least one column of a precoding matrix codeword in the codebook.

In some embodiments, the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

In some embodiments of the method illustrated in FIG. 11, the bits of the bitmap are indexed with index n, and the index n for any given bit in the bitmap equals a linear combination of the form $n=l'_1+Cl'_2$, where C is a positive integer, and $l'_1$ and $l'_2$ are first and second dimension indices, respectively, for the two-dimensional beam identified by the bit. In other embodiments, the bits of the bitmap are indexed with index n, and the index n for any given bit in the bitmap equals a linear combination of the form $n=l'_2+Cl'_1$, where C is a positive integer, and $l'_1$ and $l'_2$ are first and second dimension indices, respectively, for the two-dimensional beam identified by the bit.

In some embodiments, each precoding matrix codeword is defined as a matrix whose columns are determined using at least one pair of dimension indices, each pair of dimension indices comprising a first dimension index and a second dimension index. In these embodiments, each bit of a predetermined value in the bitmap indicates one or more precoding matrix codewords where, for each precoding matrix codeword, the precoding matrix codeword is not allowed to be reported in CSI feedback if, for at least one pair of dimension indices for the precoding matrix codeword, the first dimension index is equal to the first dimension index $l'_1$ and the second dimension index is equal to the second dimension index $l'_2$.

In some embodiments, each bit of a predetermined value in the bitmap indicates that, for a rank r, any given precoding matrix codeword of the codebook of precoding matrix codewords is not allowed to be reported in CSI feedback if transmissions using the precoding matrix codeword would have at least one spatially multiplexed layer of data on a two-dimensional beam identified by the bit. In some embodiments, each bit of a predetermined value in the bitmap indicates that, for a rank r, a precoding matrix codeword of the codebook of precoding matrix codewords is not allowed to be reported in CSI feedback if at least one column of the precoding matrix codeword has a set of rows that are all equal to the corresponding elements of the two-dimensional beam identified by the bit.

In some embodiments or instances of the method shown in FIG. 11, the radio network node 80 subsequently receives, from the wireless device 90, CSI feedback reporting a precoding matrix codeword that is not among the identified subset of precoding matrix codewords that are not to be reported by the wireless device 90 in CSI feedback. This is shown at block 1130. The radio network node 80 then applies the reported precoding matrix codeword to one or more two-dimensional multiple-input multiple-output transmissions to the wireless device 90, as shown at block 1140.

According to embodiments herein, there is further provided a radio network node 80 for configuring a wireless device in a wireless network 100, the radio network node 80 comprising processing circuitry and a memory, the memory containing instructions executable by the processing circuitry, whereby the radio network node 80 is adapted and/or configured and/or operative to identify, among a predetermined codebook of precoding matrix codewords, a subset of precoding matrix codewords that are not to be reported by the wireless device 90 in channel-state-information (CSI) feedback, and to transmit, to the wireless device 90, a bitmap identifying the subset of precoding matrix codewords that are not to be reported by the wireless device 90. Again, each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined a vector of complex numbers comprised within at least one column of a precoding matrix codeword in the codebook.

Again, in some embodiments, the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

Details regarding further features of the corresponding method embodiments have already been provided above so it is considered unnecessary to repeat such details. This goes for all embodiments related to the radio network node 80 that will be disclosed below.

Figure 12:
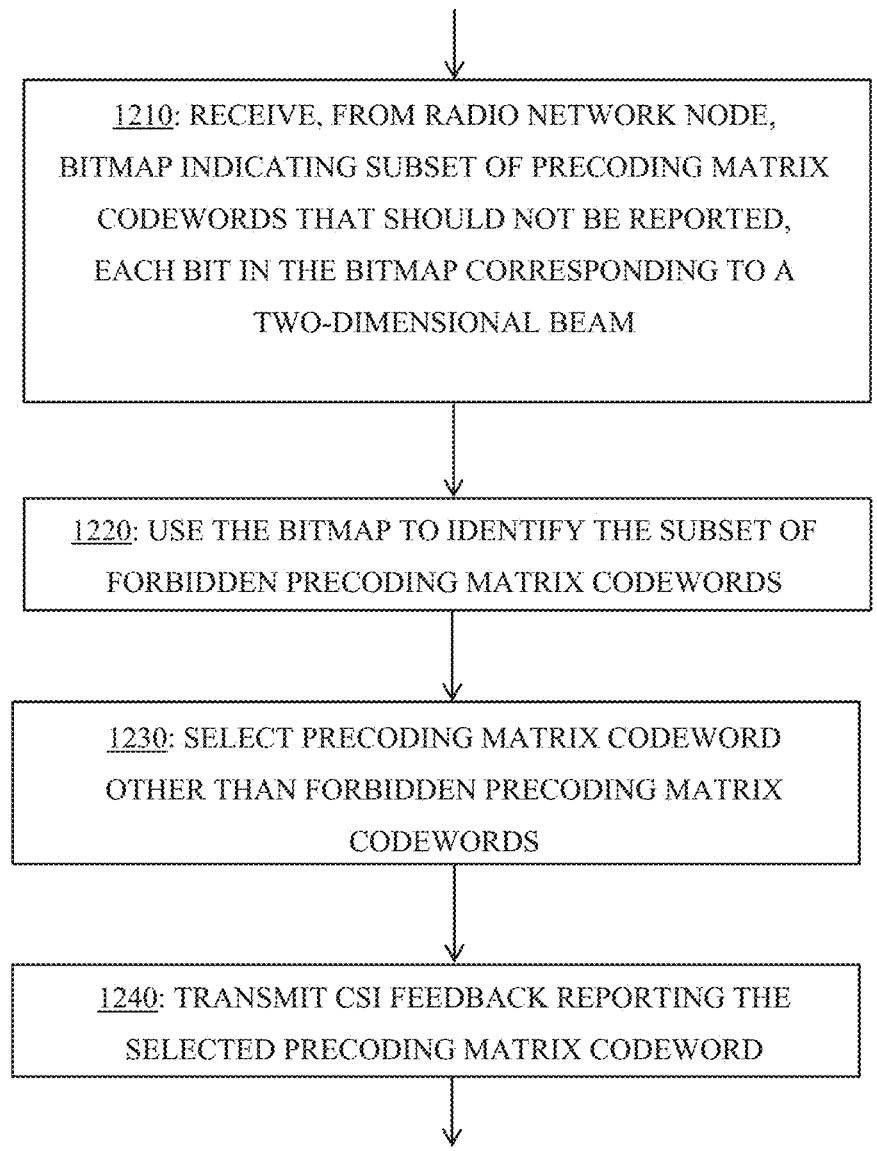
FIG. 12 illustrates a method performed in a wireless device 90 according to embodiments herein.

In the following and according to embodiments herein, there are provided methods, by/in a wireless device 90 operating in a wireless network 100. An example method is illustrated in FIG. 12 and comprises, as shown at block 1210, receiving, from a radio network node 80, a bitmap indicating, among a predetermined codebook of precoding matrix codewords, a subset of precoding matrix codewords that are not to be reported by the wireless device 90 in channel-state-information (CSI) feedback. The method further comprises, as shown at block 1220, identifying, using the bitmap, the subset of precoding matrix codewords that are not to be reported by the wireless device 90 in CSI feedback. Each bit in the bitmap corresponds to only one combination of a first dimension index $l'_1$ and a second dimension index $l'_2$ out of the possible combinations of the first dimension index $l'_1$ and the second dimension index $l'_2$, where the first dimension index $l'_1$ and the second dimension index $l'_2$ identify a two-dimensional beam, the two-dimensional beam being defined by a vector of complex numbers comprised within at least one column of a precoding matrix codeword in the codebook. As above, in some embodiments, the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

In some embodiments of the method illustrated in FIG. 12, the bits of the bitmap are indexed with index n, and the index n for any given bit in the bitmap equals a linear combination of the form $n=l'_1+Cl'_2$, where C is a positive integer, and $l'_1$ and $l'_2$ are first and second dimension indices, respectively, for the two-dimensional beam identified by the bit. In other embodiments, the bits of the bitmap are indexed with index n, and the index n for any given bit in the bitmap equals a linear combination of the form $n=l'_2+Cl'_1$, where C is a positive integer, and $l'_1$ and $l'_2$ are first and second dimension indices, respectively, for the two-dimensional beam identified by the bit.

In some embodiments, each precoding matrix codeword is defined as a matrix whose columns are determined using at least one pair of dimension indices, each pair of dimension indices comprising a first dimension index and a second dimension index. In these embodiments, each bit of a predetermined value in the bitmap indicates one or more precoding matrix codewords where, for each precoding matrix codeword, the precoding matrix codeword is not allowed to be reported in CSI feedback if, for at least one pair of dimension indices for the precoding matrix codeword, the first dimension index is equal to the first dimension index $l'_1$ and the second dimension index is equal to the second dimension index $l'_2$.

In some embodiments, each bit of a predetermined value in the bitmap indicates that, for a rank r, any given precoding matrix codeword of the codebook of precoding matrix codewords is not allowed to be reported in CSI feedback if transmissions using the precoding matrix codeword would have at least one spatially multiplexed layer of data on a two-dimensional beam identified by the bit. In some embodiments, each bit of a predetermined value in the bitmap indicates that, for a rank r, a precoding matrix codeword of the codebook of precoding matrix codewords is not allowed to be reported in CSI feedback if at least one column of the precoding matrix codeword has a set of rows that are all equal to the corresponding elements of the two-dimensional beam identified by the bit.

In some embodiments or instances of the method shown in FIG. 12, the wireless device 90 subsequently selects a precoding matrix codeword, from precoding matrix codewords in the predetermined codebook other than those precoding matrix codewords in the identified subset. This selecting, which is shown at block 1230 of FIG. 12, is based on one or more channel measurements. The method may further comprises, as shown at block 1240, transmitting, to the radio network node 80, CSI feedback reporting the selected precoding matrix codeword.

According to embodiments herein, there is further provided a wireless device 90, comprising a processing circuitry and a memory, the memory containing instructions executable by the processing circuitry, whereby the wireless device 90 is adapted and/or configured and/or operative to receive, from a radio network node 80, a bitmap indicating, among a predetermined codebook of precoding matrix codewords, a subset of precoding matrix codewords that are not to be reported by the wireless device 90 in channel-state-information (CSI) feedback; and to identify, using the bitmap, the subset of precoding matrix codewords that are not to be reported by the wireless device 90 in CSI feedback. Each bit in the bitmap corresponds to only one combination of a first dimension index $l'_1$ and a second dimension index $l'_2$ out of the possible combinations of the first dimension index $l'_1$ and the second dimension index $l'_2$, and wherein the first dimension index $l'_1$ and the second dimension index $l'_2$ identify a two-dimensional beam, the two-dimensional beam being defined by a vector of complex numbers comprised within at least one column of a precoding matrix codeword in the codebook. Details regarding features of the corresponding method embodiment have already been provided above so it is considered unnecessary to repeat such details. This goes for all embodiments related to the wireless device 90 that will be disclosed below.

Figure 13:
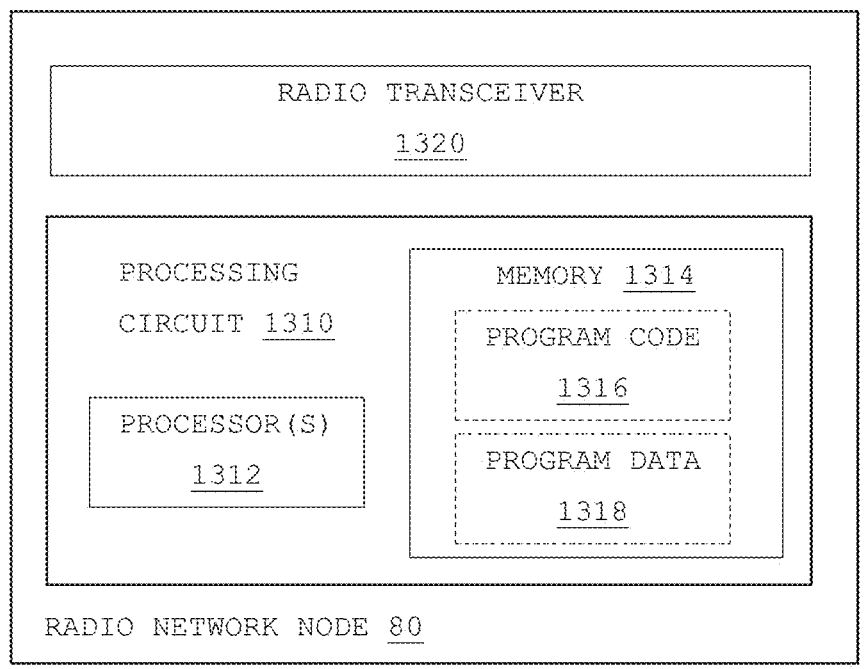
FIG. 13 is a block diagram illustrating a radio network node 80, according to exemplary embodiments herein.

Referring to FIG. 13 there is illustrated a block diagram of exemplary components of a radio network node 80 in accordance with embodiments disclosed above. The radio network node 80 may comprise a radio transceiver 1320, which in turn includes a receiver circuit and a transmitter circuit, which are coupled, in some embodiments, to a two-dimensional array of antennas (not shown). Radio network node further comprises a processing circuit 1310, which in turn comprises one or more processors, e.g., microprocessors, microcontrollers, digital signal processors, and the like, a memory circuit 1314. Memory circuit 1314, which may comprise one or several types of memory, such as Flash, RAM, ROM, etc., stores program code 1316 for execution by processor(s) 1312; the program code 1316 includes instructions for controlling the operation of radio transceiver 1320 and for carrying out a method like those described above in connection with FIG. 11, for example. Memory circuit 1314 further provides storage for program data 1318, which may be generated and/or utilized by the executing program code 1316 in the course of carrying out one or more of the methods described herein. Processing circuit 1310, which may be implemented as one or more application-specific integrated circuits (ASICs) in some embodiments, may further include additional digital logic configured to carry out one or more of the operations described herein, alone, or in conjunction with processor(s) 1312, and may further include additional supporting circuitry, e.g., for regulating power supplies, generating necessary clock or other timing signals, converting analog signals to digital signals and/or vice-versa, etc.

The memory 1314 may contain instructions executable by the processor(s) 1310 whereby the radio network node 80 is operative to perform method steps described herein as implemented in a radio network node. There is also provided a computer program comprising computer readable code means which, when run in the radio network node 80, e.g., by means of the processor or processing circuit 1310, causes the radio network node 80 to perform the above described method steps, which include, in some embodiments, identifying, among a predetermined codebook of precoding matrix codewords, a subset of precoding matrix codewords that are not to be reported by the wireless device 90 in CSI feedback, and transmitting, to the wireless device 90, a bitmap identifying the subset of precoding matrix codewords that are not to be reported by the wireless device 90.

It will be appreciated that all or parts of radio network node 80 may also be conceived as comprising one or more functional modules, with each functional module being implemented with hardware and/or with hardware configured with appropriate software or firmware, and corresponding to one or more of the method steps described herein as implemented in a radio network node 80. Thus, for example, radio network node 80 may be understood as comprising an identification module for identifying, among a predetermined codebook of precoding matrix codewords, a subset of precoding matrix codewords that are not to be reported by the wireless device 90 in CSI feedback, and as further comprising a transmitter module for transmitting, to the wireless device 90, a bitmap identifying the subset of precoding matrix codewords that are not to be reported by the wireless device 90. In some embodiments, radio network node 80 may be understood to further comprise a receiver module for receiving, from the wireless device 90, CSI feedback reporting a precoding matrix codeword that is not among the identified subset of precoding matrix codewords that are not to be reported by the wireless device 90 in CSI feedback, as well as a precoder module for applying the reported precoding matrix codeword to one or more two-dimensional multiple-input multiple-output transmissions to the wireless device.

Figure 14:
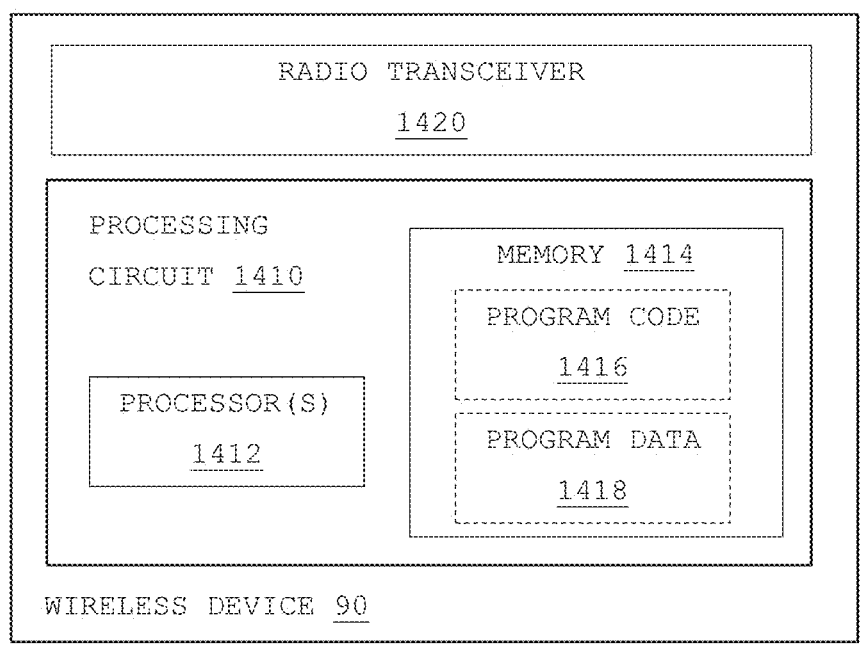
FIG. 14 is a block diagram illustrating a wireless device 90, according to exemplary embodiments herein.

Referring to FIG. 14 there is illustrated a block diagram of exemplary components of a wireless device 90 in accordance with embodiments disclosed above. The wireless device 90 may comprise a radio transceiver 1420, which in turn includes a receiver circuit and a transmitter circuit, which are coupled, in some embodiments, to a two-dimensional array of antennas (not shown). Radio network node further comprises a processing circuit 1410, which in turn comprises one or more processors, e.g., microprocessors, microcontrollers, digital signal processors, and the like, a memory circuit 1414. Memory circuit 1414, which may comprise one or several types of memory, such as Flash, RAM, ROM, etc., stores program code 1416 for execution by processor(s) 1412; the program code 1416 includes instructions for controlling the operation of radio transceiver 1420 and for carrying out a method like those described above in connection with FIG. 12, for example. Memory circuit 1414 further provides storage for program data 1418, which may be generated and/or utilized by the executing program code 1416 in the course of carrying out one or more of the methods described herein. Processing circuit 1410, which may be implemented as one or more application-specific integrated circuits (ASICs) in some embodiments, may further include additional digital logic configured to carry out one or more of the operations described herein, alone, or in conjunction with processor(s) 1412, and may further include additional supporting circuitry, e.g., for regulating power supplies, generating necessary clock or other timing signals, converting analog signals to digital signals and/or vice-versa, etc.

The memory 1414 may contain instructions executable by the processor(s) or processing circuit 1410 whereby the wireless device 90 is operative to perform the previously described method steps. There is also provided a computer program comprising computer readable code means which when run in the wireless device 90, e.g., by means of the processor or processing circuit 1410, causes the wireless device 90 to perform the above described method steps, which include, in some embodiments, receiving, from a radio network node 80, a bitmap indicating, among a predetermined codebook of precoding matrix codewords, a subset of precoding matrix codewords that are not to be reported by the wireless device 90 in CSI feedback, and identifying, using the bitmap, the subset of precoding matrix codewords that are not to be reported by the wireless device 90 in CSI feedback.

It will be appreciated that all or parts of wireless device 90 may also be conceived as comprising one or more functional modules, with each functional module being implemented with hardware and/or with hardware configured with appropriate software or firmware, and corresponding to one or more of the method steps described herein as implemented in a wireless device 90. Thus, for example, wireless device 90 may be understood as comprising a receiver module for receiving, from a radio network node 80, a bitmap indicating, among a predetermined codebook of precoding matrix codewords, a subset of precoding matrix codewords that are not to be reported by the wireless device 90 in CSI feedback, as well as an identification module for identifying, using the bitmap, the subset of precoding matrix codewords that are not to be reported by the wireless device 90 in CSI feedback. In some embodiments, wireless device may be understood to further comprise a selection module for selecting a precoding matrix codeword from precoding matrix codewords in the predetermined codebook other than those precoding matrix codewords in the identified subset, where said selecting is based on one or more channel measurements, as well as a transmitter module for transmitting, to the network node 80, CSI feedback reporting the selected precoding matrix codeword.

A wireless network 100 may be any communication system as defined by 3GPP, such as UMTS, LTE, GSM, CDMA2000 or a core network such as EPS or any combination of those.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP and IEEE802.11 EEE has been used in this disclosure to exemplify the invention, this should not be seen as limiting the scope of the invention to only the aforementioned system. Other communication systems, including LTE or LTE-A (LTE-Advanced) and WiMax may also benefit from exploiting the ideas covered within this disclosure.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a radio network node, for configuring a wireless device in a wireless network, the method comprising:

identifying, among a predetermined codebook of precoding matrix codewords, a subset of precoding matrix codewords that are not to be reported by the wireless device in channel-state-information (CSI) feedback; and transmitting, to the wireless device, a bitmap identifying the subset of precoding matrix codewords that are not to be reported by the wireless device;

wherein each bit in the bitmap corresponds to only one combination of a first dimension index $l'_1$ and a second dimension index $l'_2$ out of possible combinations of the first dimension index $l'_1$ and the second dimension index $l'_2$, and wherein the first dimension index $l'_1$ and the second dimension index $l'_2$ identify a two-dimensional beam, the two-dimensional beam being defined by a vector of complex numbers comprised within at least one column of a precoding matrix codeword in the codebook.

2. The method of claim 1, wherein the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

3. The method of claim 1, wherein the bits of the bitmap are indexed with index n and the index n for any given bit in the bitmap equals a linear combination of the form $n=l'_1+Cl'_2$, where C is a positive integer, and $l'_1$ and $l'_2$ are first and second dimension indices, respectively, for the two-dimensional beam identified by the bit.

4. The method of claim 1, wherein each precoding matrix codeword is defined as a matrix whose columns are determined using at least one pair of dimension indices, each pair of dimension indices comprising a first dimension index and a second dimension index, and wherein each bit of a predetermined value in the bitmap indicates one or more precoding matrix codewords where, for each precoding matrix codeword, the precoding matrix codeword is not allowed to be reported in CSI feedback if, for at least one pair of dimension indices for the precoding matrix codeword, the first dimension index is equal to the first dimension index $l'_1$ and the second dimension index is equal to the second dimension index $l'_2$.

5. The method of claim 1, wherein each bit of a predetermined value in the bitmap indicates that, for a rank r, any given precoding matrix codeword of the codebook of precoding matrix codewords is not allowed to be reported in CSI feedback if transmissions using the precoding matrix codeword would have at least one spatially multiplexed layer of data on a two-dimensional beam identified by the bit.

6. The method of claim 1, wherein each bit of a predetermined value in the bitmap indicates that, for a rank r, a precoding matrix codeword of the codebook of precoding matrix codewords is not allowed to be reported in CSI feedback if at least one column of the precoding matrix codeword has a set of rows that are all equal to the corresponding elements of the two-dimensional beam identified by the bit.

7. The method of claim 1, further comprising:
receiving, from the wireless device, CSI feedback reporting a precoding matrix codeword that is not among the identified subset of precoding matrix codewords that are not to be reported by the wireless device in CSI feedback; and
applying the reported precoding matrix codeword to one or more two-dimensional multiple-input multiple-output transmissions to the wireless device.

8. A method, in a wireless device operating in a wireless network, the method comprising:
receiving, from a radio network node, a bitmap indicating, among a predetermined codebook of precoding matrix codewords, a subset of precoding matrix codewords that are not to be reported by the wireless device in channel-state-information (CSI) feedback; and
identifying, using the bitmap, the subset of precoding matrix codewords that are not to be reported by the wireless device in CSI feedback,
wherein each bit in the bitmap corresponds to only one combination of a first dimension index $l'_1$ and a second dimension index $l'_2$ out of possible combinations of the first dimension index $l'_1$ and the second dimension index $l'_2$, and wherein the first dimension index $l'_1$ and the second dimension index $l'_2$ identify a two-dimensional beam, the two-dimensional beam being defined by a vector of complex numbers comprised within at least one column of a precoding matrix codeword in the codebook.

9. The method of claim 8, wherein the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

10. The method of claim 8, wherein the bits of the bitmap are indexed with index n and the index n for any given bit in the bitmap equals a linear combination of the form $n = l'_i + Cl'_2$, where C is a positive integer, and $l'_1$ and $l'_2$ are first and second dimension indices, respectively, for the two-dimensional beam identified by the bit.

11. The method of claim 8, wherein each precoding matrix codeword is defined as a matrix whose columns are determined using at least one pair of dimension indices, each pair of dimension indices comprising a first dimension index and a second dimension index, and wherein each bit of a predetermined value in the bitmap indicates one or more precoding matrix codewords where, for each precoding matrix codeword, the precoding matrix codeword is not allowed to be reported in CSI feedback if, for at least one pair of dimension indices for the precoding matrix codeword, the first dimension index is equal to the first dimension index $l'_1$ and the second dimension index is equal to the second dimension index $l'_2$.

12. The method of claim 8, wherein each bit of a predetermined value in the bitmap indicates that, for a rank r, any given precoding matrix codeword of the codebook of precoding matrix codewords is not allowed to be reported in CSI feedback if transmissions using the precoding matrix codeword would have at least one spatially multiplexed layer of data on a two-dimensional beam identified by the bit.

13. The method of claim 8, wherein each bit of a predetermined value in the bitmap indicates that, for a rank r, a precoding matrix codeword of the codebook of precoding matrix codewords is not allowed to be reported in CSI feedback if at least one column of the precoding matrix codeword has a set of rows that are all equal to the corresponding elements of the two-dimensional beam identified by the bit.

14. The method of claim 8, further comprising:
selecting a precoding matrix codeword, from precoding matrix codewords in the predetermined codebook other than those precoding matrix codewords in the identified subset, wherein said selecting is based on one or more channel measurements; and
transmitting, to the network node, CSI feedback reporting the selected precoding matrix codeword.

15. A radio network node, for configuring a wireless device in a wireless network, the radio network node comprising processing circuitry and a memory, said memory containing instructions executable by said processing circuitry, whereby said radio network node is configured to:
identify, among a predetermined codebook of precoding matrix codewords, a subset of precoding matrix codewords that are not to be reported by the wireless device in channel-state-information (CSI) feedback; and
transmit, to the wireless device, a bitmap identifying the subset of precoding matrix codewords that are not to be reported by the wireless device;
wherein each bit in the bitmap corresponds to only one combination of a first dimension index $l'_1$ and a second dimension index $l'_2$ out of possible combinations of the first dimension index $l'_1$ and the second dimension index $l'_2$, and wherein the first dimension index $l'_1$ and the second dimension index $l'_2$ identify a two-dimensional beam, the two-dimensional beam being defined by a vector of complex numbers comprised within at least one column of a precoding matrix codeword in the codebook.

16. The radio network node of claim 15, wherein the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

17. The radio network node of claim 15, wherein the memory containing instructions executable by said processing circuitry further comprises instructions for receiving, from the wireless device, CSI feedback reporting a precoding matrix codeword that is not among the identified subset of precoding matrix codewords that are not to be reported by the wireless device in CSI feedback, and applying the reported precoding matrix codeword to one or more two-dimensional multiple-input multiple-output transmissions to the wireless device.

18. A wireless device for operating in a wireless network, the wireless device comprising processing circuitry and a memory, said memory containing instructions executable by said processing circuitry, whereby said wireless device is configured to:
receive, from a radio network node, a bitmap indicating, among a predetermined codebook of precoding matrix codewords, a subset of precoding matrix codewords that are not to be reported by the wireless device in channel-state-information (CSI) feedback; and identify, using the bitmap, the subset of precoding matrix codewords that are not to be reported by the wireless device in CSI feedback, wherein each bit in the bitmap corresponds to only one combination of a first dimension index $l'_1$ and a second dimension index $l'_2$ out of possible combinations of the first dimension index $l'_1$ and the second dimension index $l'_2$, and wherein the first dimension index $l'_1$ and the second dimension index $l'_2$ identify a two-dimensional beam, the two-dimensional beam being defined by a vector of complex numbers comprised within at least one column of a precoding matrix codeword in the codebook.

19. The wireless device of claim 18, wherein the first dimension index $l'_1$ and the second dimension index $l'_2$ are first and second forbidden dimension indices, respectively, such that the first dimension index $l'_1$ and the second dimension index $l'_2$ identify a forbidden two-dimensional beam for which corresponding precoding matrix codewords are not to be reported.

20. The wireless device of claim 18, wherein the memory containing instructions executable by said processing circuitry further comprises instructions for selecting a precoding matrix codeword, from precoding matrix codewords in the predetermined codebook other than those precoding matrix codewords in the identified subset, wherein said selecting is based on one or more channel measurements, and transmitting, to the network node, CSI feedback reporting the selected precoding matrix codeword.

\* \* \* \* \*